(12) United States Patent
Smithline et al.

(10) Patent No.: US 7,051,069 B2
(45) Date of Patent: May 23, 2006

(54) SYSTEM FOR MANAGING LOGICAL PROCESS FLOW IN AN ONLINE ENVIRONMENT

(75) Inventors: Neil Smithline, Newton, MA (US); Sathyanarayana Giridhar, Boulder, CO (US)

(73) Assignee: BEA Systems, Inc., San Jose, CA (US)

( * ) Notice: Subject to any disclaimer, the term of this patent is extended or adjusted under 35 U.S.C. 154(b) by 568 days.

(21) Appl. No.: 09/908,023

(22) Filed: Jul. 18, 2001

(65) Prior Publication Data
US 2002/0138556 A1  Sep. 26, 2002

Related U.S. Application Data

(60) Provisional application No. 60/236,898, filed on Sep. 28, 2000.

(51) Int. Cl.
*G06F 13/00* (2006.01)
(52) U.S. Cl. .................................................... 709/203
(58) Field of Classification Search ................ 705/1, 705/26, 10, 201, 203; 707/1, 10; 709/200, 709/201, 203
See application file for complete search history.

(56) References Cited

U.S. PATENT DOCUMENTS

| | | | | |
|---|---|---|---|---|
| 5,369,702 A | * | 11/1994 | Shanton | 713/166 |
| 5,848,396 A | | 12/1998 | Gerace | 705/10 |
| 5,897,622 A | * | 4/1999 | Blinn et al. | 705/26 |
| 5,983,227 A | * | 11/1999 | Nazem et al. | 707/10 |
| 5,999,914 A | * | 12/1999 | Blinn et al. | 705/26 |
| 6,029,182 A | * | 2/2000 | Nehab et al. | 715/523 |
| 6,038,590 A | * | 3/2000 | Gish | 709/203 |
| 6,058,392 A | | 5/2000 | Sampson et al. | 707/6 |
| 6,141,010 A | * | 10/2000 | Hoyle | 715/854 |
| 6,157,924 A | * | 12/2000 | Austin | 707/10 |
| 6,182,226 B1 | * | 1/2001 | Reid et al. | 713/201 |
| 6,226,745 B1 | * | 5/2001 | Wiederhold | 713/200 |
| 6,241,608 B1 | * | 6/2001 | Torango | 463/27 |
| 6,260,050 B1 | * | 7/2001 | Yost et al. | 715/501.1 |
| 6,269,393 B1 | * | 7/2001 | Yost et al. | 709/201 |
| 6,285,985 B1 | * | 9/2001 | Horstmann | 705/14 |
| 6,308,163 B1 | * | 10/2001 | Du et al. | 705/8 |
| 6,539,375 B1 | * | 3/2003 | Kawasaki | 707/5 |
| 6,571,247 B1 | * | 5/2003 | Danno et al. | 707/100 |
| 6,587,849 B1 | * | 7/2003 | Mason et al. | 707/5 |
| 6,754,672 B1 | * | 6/2004 | McLauchlin | 707/104.1 |
| 2002/0069261 A1 | * | 6/2002 | Bellare et al. | 709/218 |
| 2002/0107913 A1 | * | 8/2002 | Rivera et al. | 709/203 |

(Continued)

OTHER PUBLICATIONS

Sundsted, Todd, "JNDI Overview, Part 1: An Introduction to Naming Services", JavaWorld, Jan. 2000, pp. 1-6, (downloaded from: www.javaworld.com/javaworld/jw-01-2000/jw-01-howto_p.html).*

(Continued)

*Primary Examiner*—Robert B. Harrell
(74) *Attorney, Agent, or Firm*—Fliesler Meyer LLP

(57) ABSTRACT

The invention uses a state machine to control the flow throughout a Web site including the execution of business logic, error handling and dispatching based on both user and programming events. This state machine is used as input to a flow processor and therein guides the system. The flow processor controls a series of online functions including HTML links, HTML form submissions, form processing, business logic execution, and business logic exceptions into one simple-to-manage element. Any required change to the logic flow of the system can be made by modifying just the flow processor itself, without necessary changes to the referenced online functions.

30 Claims, 28 Drawing Sheets

U.S. PATENT DOCUMENTS

| | | |
|---|---|---|
| 2002/0111998 A1 | 8/2002 | Kim |
| 2002/0124053 A1 | 9/2002 | Adams et al. |
| 2002/0173971 A1* | 11/2002 | Stripe et al. .................... 705/1 |
| 2003/0065721 A1 | 4/2003 | Roskind |
| 2003/0078972 A1 | 4/2003 | Taipssier et al. |
| 2003/0131113 A1* | 7/2003 | Reeves et al. .............. 709/229 |
| 2003/0187956 A1 | 10/2003 | Belt et al. |
| 2003/0229623 A1* | 12/2003 | Chang et al. ................... 707/3 |
| 2004/0003071 A1 | 1/2004 | Matthew et al. |
| 2004/0019650 A1 | 1/2004 | Auvenshine |
| 2004/0024812 A1 | 2/2004 | Park et al. |

OTHER PUBLICATIONS

Moore, Bill, et al., "Migrating WebLogic Applications to WebSphere Advanced Edition", IBM Redbooks, Jan. 2001, pp. 1, 3-4, 109-111 and 181-195.*

Barrett, Alexandra, "Trying Out Transactions", SunExpert Magazine, Jan. 1999, pp. 57-59.*

Ayers, Danny, et al., Professional Java Server Programming, Wrox Press, Ltd., Birmingham, UK, Dec. 1999, pp. 515-545.*

Ford, Nigel, Web Developer.com Guide to Building Intelligent Web Sites with JavaScript, Wiley Computer Publishing, New York, NY, © 1998, pp. 65-86, 96-98, 101-102, 245-250 and 324-327.*

Microsoft Computer Dictionary, 4th Edition, Microsoft Press, Redmond, WA, © 1999, p. 489.*

Eiji Okamoto, "Proposal for Integrated Security Systems", Jun. 1992, IEEE Computer Society Press, p354-358.* http://java.sun.com/products/ejb/ (last visit: Dec. 7, 2004).* http://www.javaworld.com/javaworld/jw-12-2002/jw-1207-yesnoejb_p.html (last visit: Dec. 7, 2004).*

Moore, Bill, et al., "Migrating WebLogic Applications to WebSphere Advance Editiion", IBM Redbooks, Jan. 2001 pp. 1,3-4, 109-111 and 181-195.

Microsoft Computer Dictionary, 4th Edition, Microsoft Press, Redmond, WA © 1999, p. 489.

Eji Okamoto, Proposal for Integrated Security System, Jun. 1992, IEEE Computer Socieity Press, p. 345-358.

http://java.sun.com/products/ejb/(last vista: Dec. 7, 2004).

Http://www.javawrold.com/javaworld/jw-12-2002/jw-1207-yesnoejb_p.html. (last visit: Dec. 7, 2004).

* cited by examiner

The home page declares a button event named login by including a Web page that contains a form.

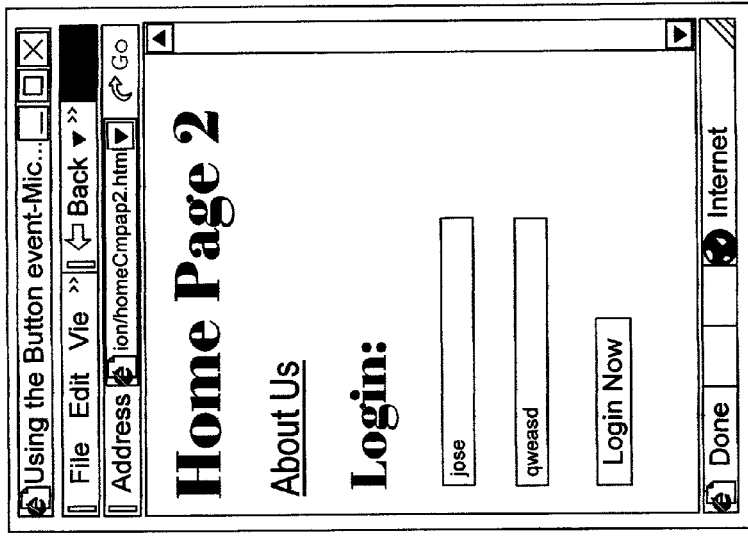

```
...
<H2>Login:</H2>
<FORM METHOD="POST"
ACTION="/application/commercewf">
    <INPUT TYPE=hidden NAME=origin
        VALUE="home.html">
    <INPUT TYPE=hidden NAME=event
        VALUE="button(login)">
<P> <INPUT TYPE=TEXT NAME=username
        VALUE="<USERNAME>">
<P> <INPUT TYPE=TEXT NAME=password
        VALUE="<PASSWORD>">
<P> <INPUT TYPE=SUBMIT
        VALUE="Login Now">
</FORM>...
```

FIG. - 13

The login page may be a JSP that has access to the HTML request parameters through a request object.

A simple about page:

```
<HTML>
<HEAD><TITLE>The Login page</TITLE></HEAD>
<BODY>
<H1>Login 2</H1>
This is a great course !!!
<P>username = <%= request.getParameter("username") %>
<P>password = <%= request.getParameter("password") %>
</BODY>
</HTML>
```

The success event is triggered when the input processor returns the "success" string.

Source code for the input processor:

```
package com.beasys.commerce.labs.CMPAP.CMPAP3;
import con.beasys.commerce.webflow.TargetProcessor;
import com.beasys.commerce.webflow.execption.ProcessingException;
import javax.servlet.http.*;
public class MyLoginIP implements TargetProcessor{
    public String process(HttpServletRequest req)
                    throws ProcessingException {
        System.out.println(req.getParameter("username"));
        System.out.println(req.getParameter("password"));
        return "success";
    }
}
```

FIG. -17

The exception event is triggered when the input processor generates an exception.

```
***;
package com.beasys.commerce.labs.CMPAP.CMPAP3;
import com.beasys.commerce.webflow.TargetProcessor;
import com.beasys.commerce.webflow.exception.ProcessingException;
import javax.servlet.http.*;
public class MyLoginIP implements TargetProcessor{
public String process(HttpServletRequest req)
                          throws ProcessingException {
    ...
    String password=req.getParameter("password")
    if(password.len()<8)
        throw new MyException("Password too short");
    return "success";
}
}
```

The Webflow mechanism directs transitions to the error page when the input processor throws an exception.

```
***.
<HTML>
<HEAD><TITLE>The Error page</TITLE></HEAD>
<BODY>
<H1>Error 4</H1>
Your password must be at least 8 characters long
<P>username = <%= request.getParameter("username") %>
<P>password = <%= request.getParameter("password") %>
</BODY></HTML>
```

ValidateIP Input Processor

```
import com.beasys.commerce.webflow.TargetProcessor;
import com.beasys.commerce.webflow.exception.*;
import com.beasys.commerce.foundation.pipeline.*;
import javax.servlet.http.*;
import java.util.*;

public class ValidateIP implements TargetProcessor {
  public String process(HttpServletRequest req)
    throws ProcessingException {
    String stateValue = req.getParameter("state");
    String zipValue   = req.getParameter("zip");

if(stateValue.length()!=2)                        // validating
      throw new ProcessingException("State error");
    if(zipValue.length()!=5)
      throw new ProcessingException("Zip code error");

HttpSession session = req.getSession(); // geting the
    PipelineSession pSession =              // session
      (PipelineSession)session.getAttribute(
        PipelineConstants.PIPELINE_ATTRIBUTE_NAME);
    ...
```

ValidateIP Input Processor...

```
...
Enumeration parameterNames = req.getParameterNames();
Vector attributeNames = new Vector();
String parameterName, parameterValue, attributeName;
while(parameterNames.hasMoreElements()) {
    parameterName = (String)parameterNames.nextElement();
    parameterValue = req.getParameter(parameterName);
    attributeName = parameterName+"Attribute";
    pSession.setAttribute(attributeName, parameterValue);
    attributeNames.addElement(attributeName);
}
pSession.setAttribute("attributeNames", attributeNames);
return "success";
}
```

FIG. - 22

ValidateUserPC Pipline Component

```
import java.rmi.RemoteException;
import com.beasys.commerce.webflow.exception.*;
//import com.beasys.commerce.foundation.exception.*;
import com.beasys.commerce.foundation.pipeline.*;
import java.util.*;
public class ValidateUserPC implements PipelineComponent {
    public PipelineSession process(PipelineSession session)
        throws PipelineFatalException,
               PipelineNonFatalException,
               RemoteException {
        String attributeValue =
            (String) session.getAttribute("usernameAttribute");
        if(!isRegisteredUser(attributeValue)) {
            throw new PipelineFatalException("Not Registered");
        }
        return session;
    }
}
```

FIG. - 23

ValidateCardPC Pipeline Component

```java
import java.rmi.RemoteException;
import com.beasys.commerce.webflow.exeception.*;
//import com.beasys.commerce.foundation.exception.*;
import com.beasys.commerce.foundation.pipeline.*;
import java.util.*;
public class ValidateCardPC implements PipelineComponent {
    public PipelineSession process(PipelineSession session)
    throws PipelineFatalException,
           PipelineNonFatalException,
           RemoteException {
        String attributeValue =
            (String)session.getAtribute("ccnumberAttribute");
        if(!isValidCardNumber(attributeValue))
            throw new PipelineFatalException("Not Registered");
        }
        return session;
    }
}
```

FIG. - 24

Validated.jsp JSP

```
<HTML><HEAD><TITLE>Pineline Example</TITLE></HEAD><BODY>
<%@ taglib uri="webflow.tld" prefix="webflow" %>
<%@ taglib uri="pipline.tld" prefix="pl" %>
<H1>Billing Information</H1>
<TABLE CELLSPACING=3>
<%! Vector attributeNames; %>
<pl:getPiplineProperty propertyName="attributeNames"
returnName="attributeNames" returnType="java.util.Vector"/>
<% Enumeration names = attributeNames.elements();
   while(names.hasMoreElements()){
       String attributeName = (string)names.nextElement();
       String attributeValue; %>
<pl:getPipelineProperty propertyName="<%=attributeName%>"
returnName="attributeValue" returnType="java.lang.string"/>
<TR><TD><%=attributeName%> </TD>
    <TD><%=attributeValue%></TD></TR>
<% }%>
</TABLE></BODY></HTML>
```

FIG. - 25

SYSTEM FOR MANAGING LOGICAL PROCESS FLOW IN AN ONLINE ENVIRONMENT

This application claims priority from provisional application "System for managing logical process flow in an online environment", application Ser. No. 60/236,898, filed Sep. 28, 2000, and incorporated herein by reference.

FIELD OF THE INVENTION

The invention relates to systems for structuring the process flow in computational environments and specifically to a system and a method which allows the separate development of the design elements and the underlying logical processes in an online environment.

BACKGROUND OF THE INVENTION

In the environment of an e-commerce application, such as a web server together with a series of web pages and web-based application, navigation of dynamic web pages is a complex task that usually requires a combination of various solutions to perform. These solutions make it difficult for a developer to determine the flow of a Web site and even more difficult to modify it.

In a Web site with dynamic content, herein referred to as a "dynamic Web site", information is typically displayed to the user in the form of hypertext markup language or HTML code (both static HTML and dynamically generated HTML), and business logic is executed or followed based upon actions initiated by the users. For example, when making a purchase on a Web site a user is often presented with a summary order page. This is an HTML page that has been dynamically generated. It shows the items in their current order, total cost and pertinent information. When they press or click the "buy" button it causes business logic to be executed that will update databases, notify suppliers, etc. When these operations have successfully completed, a success page must be displayed to the user.

A problem with this approach is that the business logic is subject to a failure for a variety of reasons, some of which are expected such as an item being out of stock, and others which are unexpected such as databases not reachable. In a typical system, each of these errors requires specialized handling. Current solutions offered today usually employ a combination of solutions including: direct navigation via HTML links, dynamic navigation via client-side JavaScript, dynamic navigation via hand-written server side solutions including servlets, JSP tags, Cold Fusion tags, server side Java beans and ASP pages, to name only a few. However, all of these methods suffer the disadvantage of being complex and cumbersome to use, require lengthy development times, are inflexible to change and can rarely be modified on the fly to effect real-time changes to the business logic. Since they incorporate elements of both user interface design and business logic processing, current methods require considerable operator expertise in both of these areas, and prevent some, such as business analysts, from participating fully in the development of the e-commerce application.

SUMMARY OF THE INVENTION

The invention uses a state machine-like mechanism to describe the flow throughout the Web site including the execution of business logic, error handling and dispatching based on both user and programming events. This state machine, herein called a "webflow", rather than just being a diagram describing the existing code, is actually used as input to a webflow processor that guides the system. It combines Web links, form submissions, form processing, business logic exection, and business logic exceptions into one simple-to-manage schema. Any required change to the logic flow of the system can be made by modifying only the webflow itself. No underlying code need be modified.

As mentioned above, a key element of the invention is the webflow mechanism. The webflow guides the progress of the interaction of the user with the actual e-commerce application system. In many cases, the e-commerce system will be a Web site hosted on a Web server, although the invention can be used with any other form of user interactive system. Different types of application code can be used to track and to modify the user interface. These codes may in one embodiment include Java Servlet Pages (JSP) to present information to the user that includes a series of buttons, links and HTML elements; input processing code which is used to modify the user input; and pipeline processing code, which may be stateless session Enterprise Java Bean (EJB) or manipulating entity EJB. An entry for each code type is included in a property file used to configure the webflow. The property file describes the various states of the JSP, HTML, and input and pipeline processing features, and also describes the transitions between those features. The transitions may include links, buttons and processing results which determine how the output of one feature affects another feature.

When properly configured, the webflow represents a tree structure along which the user is guided. The tree structure includes presentation nodes and actions nodes. Presentation nodes are what the customer actually sees in their browser, for example, these may include HTML and JSP files. While viewing the output from a presentation node, the customer's data is stored in a pipeline session. A pipeline session is a set of attributes which may in one embodiment be name value pairs which hold pertinent data on a given customer during a given session. Since the webflow acts like a state like machine, the pipeline session defines a current state for a given customer. The data stored in the pipeline session are used throughout the webflow to provide information to other features and services.

The other type of node is an action node. Action nodes do the actual work for the e-business site. In one embodiment, there are two types of action nodes: input processors and pipelines. Input processors handle the attributes of the pipeline session. Typically the input processor may either: (a) put the attribute in the pipeline session; (b) modify the value of existing attributes within that pipeline session; or (c) validate values of particular attributes within the pipeline session. A pipeline controls the flow of the business logic within the e-commerce site. Typically the pipeline comprises many pipeline components. A pipeline component is an object responsible for doing a particular portion of the business logic. Each pipeline component is thus a unit of business functionality. The e-commerce customer may combine the use of a webflow together with input processors and pipeline to modify their business functionality with ease of use and in real time.

BRIEF DESCRIPTION OF THE FIGURES

FIG. 13 shows additional steps in the creation of a Web site having a webflow in accordance with an embodiment of the invention.

FIG. 17 shows additional steps in the creation of a Web site having a webflow in accordance with an embodiment of the invention.

FIG. 19 shows additional steps in the creation of a Web site having a webflow in accordance with an embodiment of the invention.

FIG. 21 shows additional steps in the creation of a Web site having a webflow in accordance with an embodiment of the invention.

FIG. 22 shows additional steps in the creation of a Web site having a webflow in accordance with an embodiment of the invention.

FIG. 23 shows additional steps in the creation of a Web site having a webflow in accordance with an embodiment of the invention.

FIG. 24 shows additional steps in the creation of a Web site having a webflow in accordance with an embodiment of the invention.

FIG. 25 shows additional steps in the creation of a Web site having a webflow in accordance with an embodiment of the invention.

DETAILED DESCRIPTION OF THE PREFERRED EMBODIMENT

Figure 1:
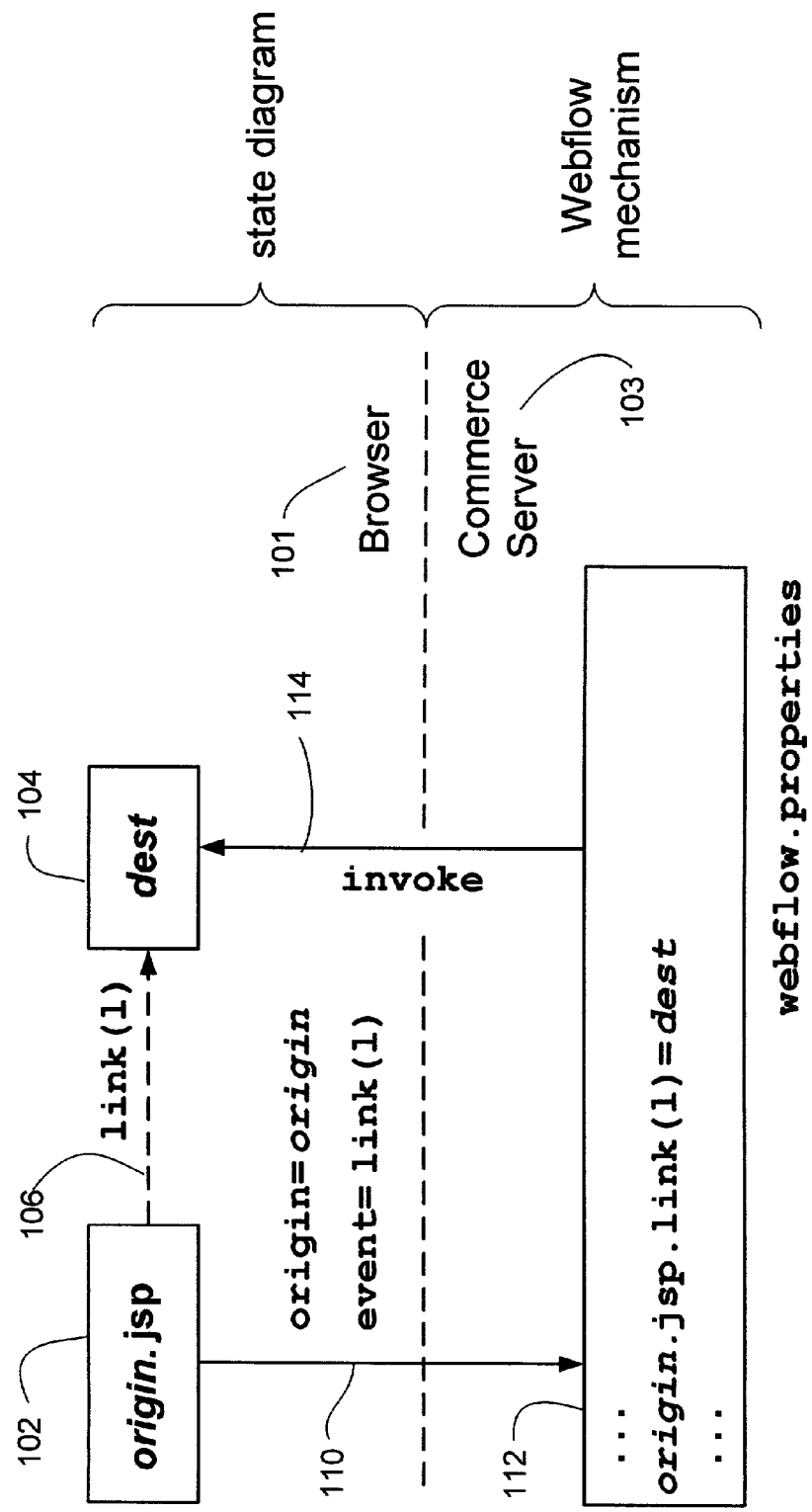
FIG. 1 shows a schematic block diagram of a state diagram in accordance with an embodiment of the invention.

As mentioned above, a key element of the invention is the webflow mechanism. The webflow guides the progress of the interaction of the user with the actual e-commerce application system. In many cases, the e-commerce system will be a Web site hosted on a Web server, although the invention can be used with any other form of a user interactive system. Different types of application code can be used to track and to modify the user interface. These codes may include Java Servlet Pages (JSP) to present information to the user that includes a series of buttons, links and HTML elements; input processing code which is used to modify the user input; and pipeline processing code, which may be stateless session Enterprise Java Bean (EJB) or manipulating entity EJB. An entry for each code type is included in a property file used to configure the webflow. The property file describes the various states of the JSP, HTML, and input and pipeline processing features, and also describes the transitions between those features. The transitions may include links, buttons and processing results which determine how the output of one feature affects another feature.

The webflow describes a state machine or state diagram that defines the transitions between presentation and action nodes, in effect determining how a user moves between these nodes. In the environment of a Web server the webflow can be implemented by a servlet application. To invoke the webflow mechanism the commerce developer must simply construct Web pages that then invoke the webflow application servlet. This is an instruction to the webflow to determine the state of events.

One of the enabling technologies for this webflow is the separation of work responsibilities that it employs. All work is broken up into one of three types of work:

1. Presentation/Display: which is determined either by HTML or JSP files, and represents what the user actually sees (in their browser).
2. Form Processors: which process HTML form submissions into a compatible Java data format, and stores the resultant objects in the pipeline session for use by the webflow and other applications.
3. Pipelines: which represent a conglomeration of business logic components that are executed in serial, one after the other, and that act upon the contents of the pipeline session.

This separation of responsibilities allows for a fine-grained control over the webflow that would not be possible if everything was written as a few large servlets or application service provider (ASP) files. Some of the benefits provided by the invention include:

The developer can change where the HTML link points to or where the form is posted to by modifying the webflow configuration. In the past this required the developer to edit the underlying HTML.

Forms and non-forms-related HTML pages can be deleted from the users display by modifying the webflow. In the past this required the developer to edit the HTML, JavaScript and/or the server side components.

Business logic functionality can be added or deleted by modifying the pipeline configuration and the server side components.

Errors in the business logic can be managed by modifying the webflow. Existing systems either provide no help for errors or only allow successful versus unsuccessful execution of the pipeline.

An embodiment of the invention includes structures and methods which allow the development of the design elements of an online environment to be separated from the development of the underlying logical processes. In one embodiment the invention provides both a webflow and a pipeline mechanism. The webflow pipeline are flexible mechanisms designed to help a site administrator, develop or manage both the presentation and business logic in an e-commerce Web site, without the need for advanced programming skills.

Several embodiments of the invention may be included in e-commerce development systems such as the BEA Web Logic Commerce Server product, produced by BEA Systems, Inc., although it will be evident to ones skilled in the art that the invention can be used with an e-commerce development platform, application, or application server, hereinafter simply referred to as a "commerce server."

Presentation and Action Nodes

When properly configured, the webflow represents a tree structure along which the user is guided. The tree structure includes presentation nodes and actions nodes. Presentation nodes are what the customer actually sees in their browser, for example, these may include HTML and JSP files. While viewing the output from a presentation node, the customer's data is stored in a pipeline session. A pipeline session is a set of attributes which may in one embodiment be name value pairs which hold pertinent data on a given customer during a given session. Since the webflow acts like a state like machine, the pipeline session defines a current state for a given customer. The data stored in the pipeline session are used throughout the webflow to provide information to other features and services.

The other type of node is an action node. Action nodes do the actual work for the e-business site. In one embodiment, there are two types of action nodes: input processors and pipelines. Input processors handle the attributes of the pipeline session, and may put the attribute in the pipeline session; modify the value of existing attributes within that pipeline session; or validate values of particular attributes within the pipeline session. A pipeline controls the flow of the business logic within thee-commerce site. Typically the pipeline comprises many pipeline components. A pipeline component is an object responsible for doing a particular portion of the business logic. Each pipeline component is thus a unit of business functionality.

Events occur as the user interacts with the presentation, for example by operating the Web site. Events may result in various outputs including a success, failure or exception. Depending on these outputs, the subsequent transitions are chosen by referencing on the webflow.

Pipeline sessions are also used for pipeline components. Through a pipeline session a pipeline component can share data amongst themselves, and with presentation nodes. In one embodiment of the invention, a pipeline session can be a Java class that is unique to each user interacting with the web application. A pipeline session is accessible as an object in action nodes and accessible through a tag library in presentation nodes. When the system first boots up, a webflow definition or configuration file (called a webflow-.properties file) is read to determine the configuration. This definition or properties file defines the state diagram of those presentation and action nodes which are linked by transitional events.

Webflow and Pipeline Elements

The webflow pipeline are flexible mechanisms designed to help a site administrator, developer or manager to manage both the presentation and business logic in an e-commerce Web site, without the need for advanced programming skills.

In particular, the invention allows an e-commerce developer to separate presentation (such as HTML and JavaScript) from business logic (such as database updates and implementation of business rules). To create and maintain this separation, a Commerce Server, in accordance with the invention, may make use of the following six technologies:

1. HTML: Standard HTML supported by a typical browser, for example, Netscape Navigator or Microsoft Internet Explorer. Throughout this document, the term HTML refers to both HTML and JavaScript.
2. JSP Tags: Customized tags used in the Java 2 Enterprise Edition (J2EE) platform. A Commerce Server can use JavaServer Page (JSP) tags to add dynamic display to the HTML pages, such as displaying the name of a customer who is currently logged in.
3. Pipeline Components: Discrete units of server-side business logic, such as calculating tax or committing an order. A plurality of pipeline components can be combined into a Pipeline.
4. Pipeline Session: A storage location for storing information about the current session (such as the current shopping cart) or more transient data (such as error messages about a customer's most recent input).
5. Input Processors: Flexible mechanisms that handle input data, for example, form submission data. Some input processors may perform validation of customer data, or store customer data into the pipeline session for subsequent use by a Pipeline component.
6. Webflow: A mechanism of logic which controls the flow of a customer's session through an application, for example, the pages displayed by the commerce server in a browser for the user to see, and also controls the execution of specific pieces of business logic. Pages generate events (the link or button the customer clicks) which result in the invocation of input processors pipelines. These may in turn either succeed or fail, from which the webflow decides which page to display or which piece of business logic to execute next. The webflow is in one embodiment configured by a webflow properties file. This webflow properties file can be modified and parsed in real-time to effect real-time changes to the Web site or application state diagram. Once parsed, the webflow embodies the logic of the properties file.

This separation between presentation and business logic is beneficial for a number of reasons, one of which is from a customization/maintenance standpoint. In any given organization, different people within that organization may perform different tasks, and may specialize in a particular area. The methods offered by the invention in keeping the user interface separate from the business processes and the Java programming allows a development team to accomplish more in less time, and makes it easier for members of the team to focus on their particular areas of expertise or interest.

The six technologies described above can be considered as belonging to four development categories: presentation, business logic, state maintenance, and flow of control.

HTML, JSP tags, and input processors comprise the presentation portion of the system. HTML is the display language understood by most Web browsers. JSP tags are used to translate information from the pipeline session to HTML. Input processors translate form-related data from HTML into a format that can be stored in the pipeline session.

Pipeline components which contain pieces of business logic have no knowledge of HTML or any of the other presentation technologies. Instead, the pipeline session maintains all of the conversational state in the system. Similarly, the webflow governs the flow of control. Together, the webflow and pipeline serve to separate the presentation side of the e-commerce development from the logic side.

An important benefit of the webflow and pipeline mechanisms is that they allow people with different levels of technical skill to customize both the presentation and business logic within an e-commerce site. Commerce engineers/JSP content developers, site administrators, and business analysts can divide Web site customization (and subsequent maintenance) activities based on their own expertise, interests, and job responsibilities. The software development team can spend their time extending the server packages to add functionality. Thus, some bottlenecks in the site development and maintenance process that exist with traditional systems are greatly reduced.

The Webflow Process

FIG. 1 shows a conceptual state diagram of a method according to the invention. As shown in FIG. 1, a user interacts with a Web site through a web browser 101. In this example, the user follows a link 106 from an origin to a destination 104. The origin 102 may for example be a Java servlet page or an HTML page and represents the web page through which the user operates. The link 106 may be an HTML link, while the destination may be another page. The originating node, in this case origin 102, invokes the webflow mechanism with the name of the originating node origin and an event, in this case, the reference to the link 106. The webflow searches for a match for this particular origin and event pair and invokes a destination node 104. In this way the transition from the origin to the destination is not predetermined by the link 106, as it would be in a static-programmed html system, but is instead enabled by the flexible mechanism of the webflow.

Figure 2:
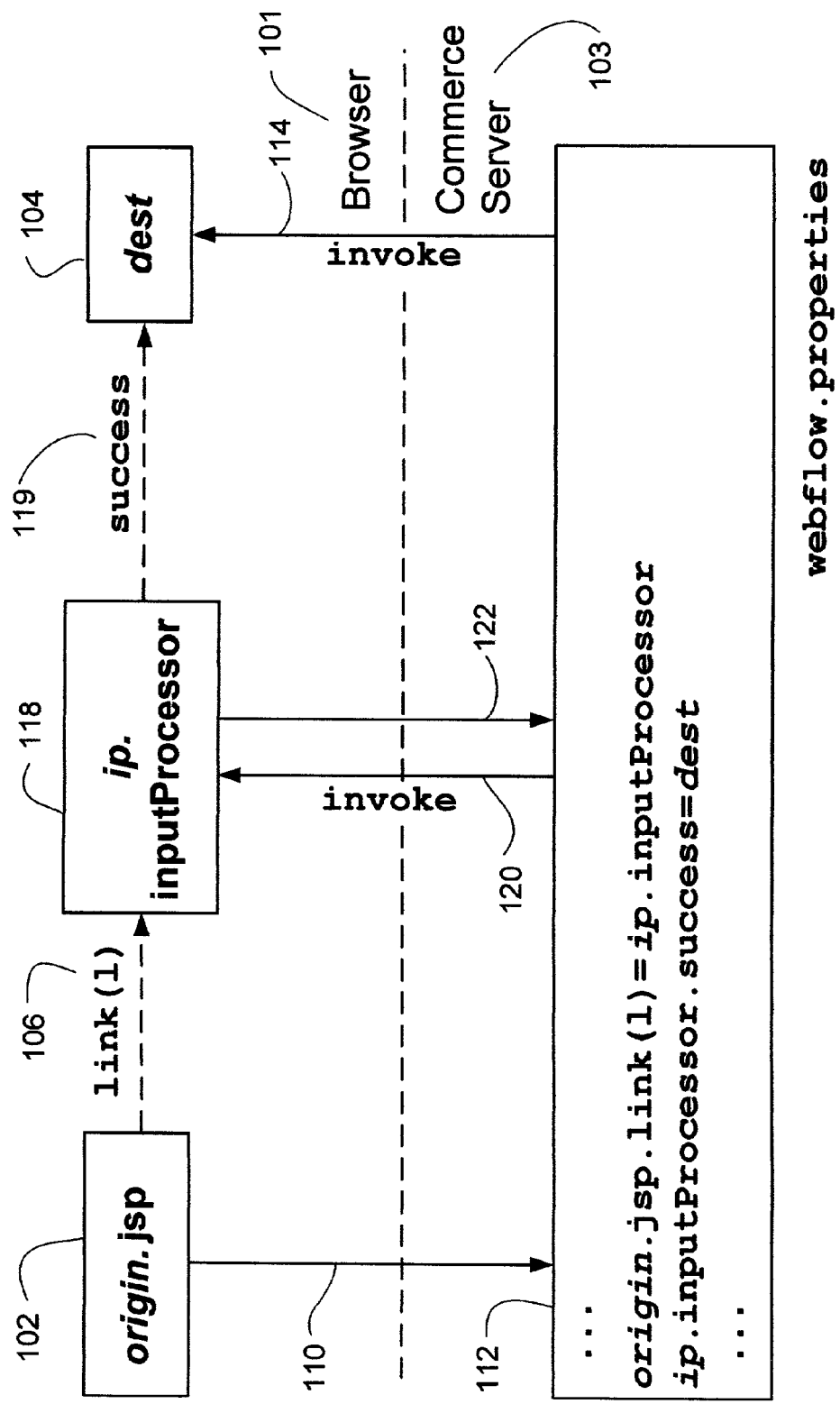
FIG. 2 shows another schematic block diagram of a state diagram in accordance with an embodiment of the invention.

FIG. 2 shows an alternate example in which an input processor 118 is used to determine the input to the webflow and to alter the output destination. As shown in FIG. 2 the origin 102 makes a call to the destination 104 via a link 106, as in the previous example. Again the webflow searches for a matching combination of origin and event pair. This time however, the matching combination found by the webflow is directed to a input processor 118. The input processor is invoked with the user data and depending on the result of the input processor, either a success or an exception may be returned. In this case the input processor is used to modify the link 106 to determine a different destination.

Figure 3:
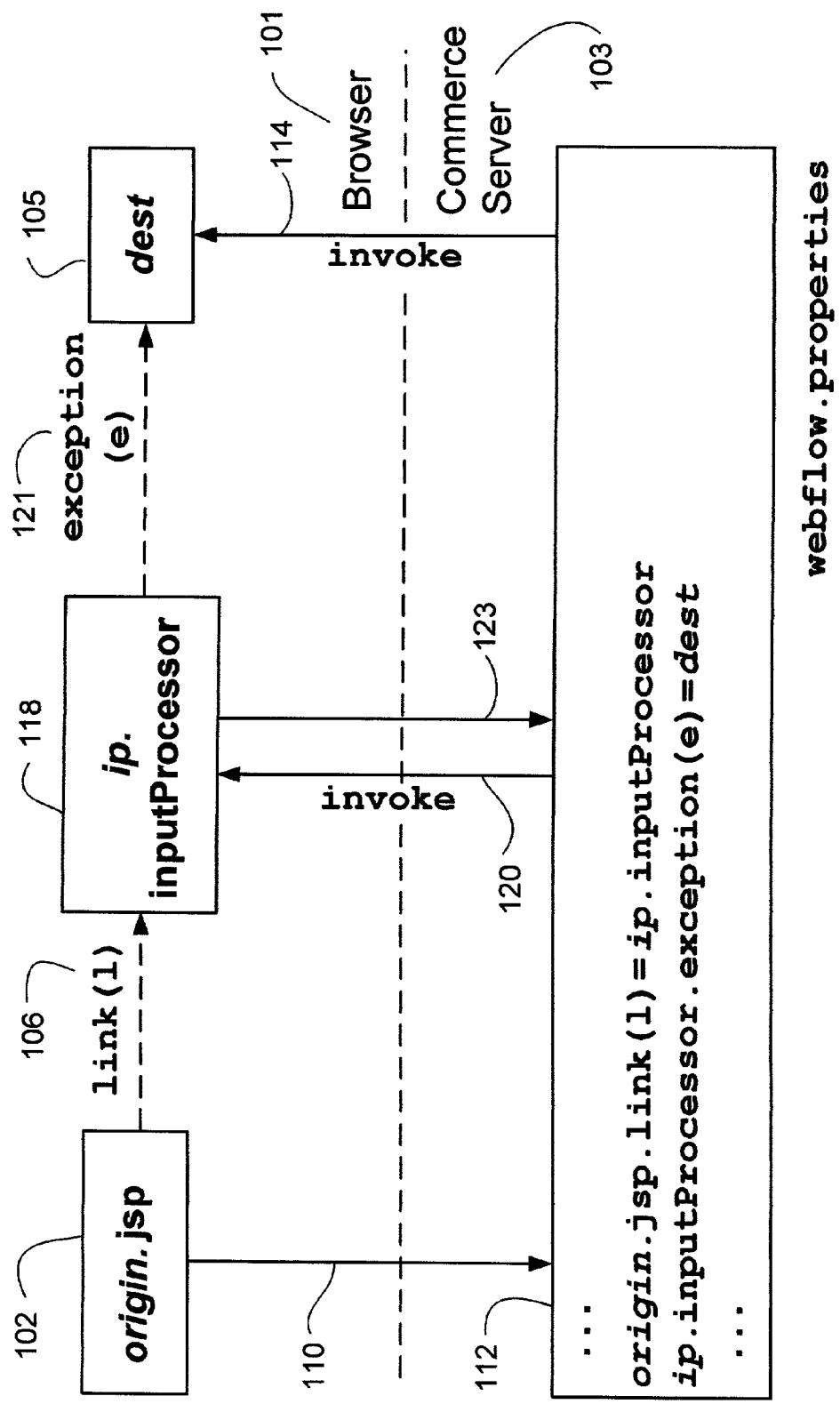
FIG. 3 shows another schematic block diagram of a state diagram in accordance with an embodiment of the invention.

In FIG. 2, the result of the input processor is a success and the destination 104 is invoked 114. The alternate example of what happens when an exception is returned is illustrated in FIG. 3. In FIG. 3, the link 106 is again used, as defined in the webflow properties file, to invoke input processor 114. In this example however an exception is recognized by the webflow, and it redirects the transition accordingly. A different destination is then invoked 105.

Webflow Properties File

Since every e-business is different, an embodiment the invention utilizes a properties file to manage the sequence (or flow) in which Web pages are displayed. This file can be modified to change the order of the Web pages, without having to edit each Web page individually.

The webflow properties file configures the order of flow in which pages are displayed. This file describes a state diagram along which action nodes and presentation nodes are distributed. The presentation nodes include Java server pages and HTML files, and determine the visual output of the webflow as seen by the user. The action nodes represent the "behind the scenes" business logic events, and can be implemented as input processors and pipelines. Throughout FIGS. 4–6 arrows within the state diagram represent actual user or webflow-initiated events such as begin, end, link, button, success or exception.

Figure 4:
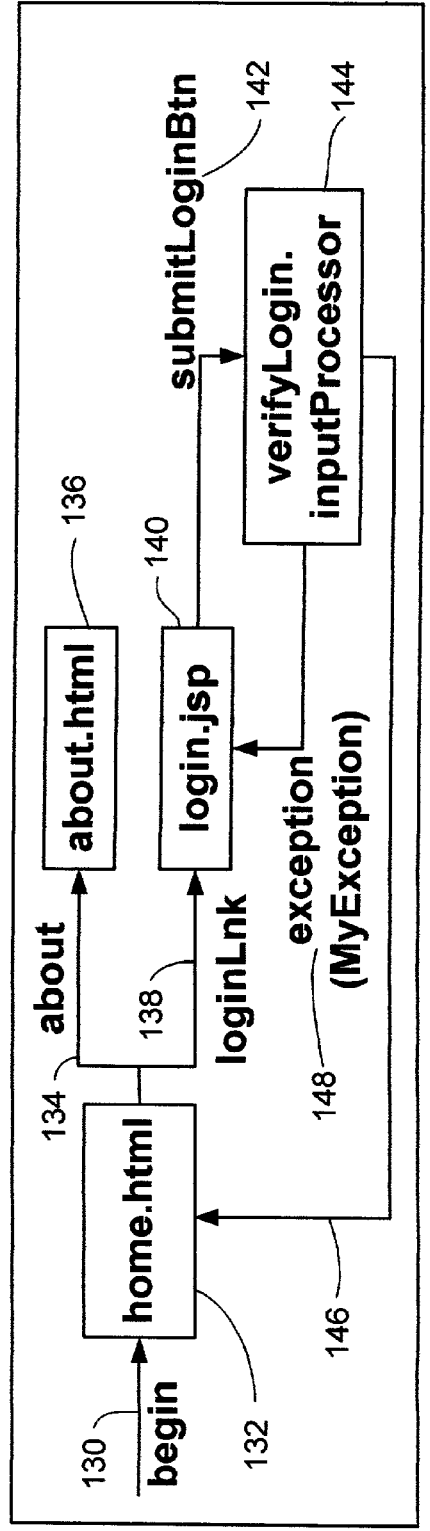
FIG. 4 shows a schematic block diagram of an input processor state diagram in accordance with an embodiment of the invention.

FIG. 4 demonstrates a simple example of a state diagram represented by the webflow properties file. The webflow properties file describes the state diagram including all of the presentation nodes—"home. HTML" 132, "about.html" 136, "login.jsp" 140, and "verify_login.jsp" 144, together with all the action events that must take place within these action nodes. As shown in FIG. 4, the process begins with a begin 130. The home.html page 132 is presented to the user. The home page is typically the first page a user encounters on a Web site. From here the user can follow an about link to an about.html file 136, for example to find information about the company or the Web site. Alternatively, the user may follow a log in link 138 which leads to a login server page 140.

The webflow as configured determines that the login servlet 140 must be pre-verified or validated by a login input processor 144, and so passes control to the input processor via an invoke 142. The output of the input processor may be a success 146 in which case the webflow determines that control is returned to the home page 132, or else an exception 148 in which case the webflow determines that control is returned to the login, perhaps so that the login may be attempted again. At each step in the process presentation nodes such as home.html and about.html represent what the user sees in their browser. These presentation nodes may be implemented with HTML pages or JSP pages. Transitions between the pages occur when an event is activated. The action nodes in the webflow state diagram, for example the input processor 144, represent business logic in the application. This business logic may be implemented with Java code that executes as a result of an event. Action nodes may comprise input processors as above, for preprocessing data prior to execution, or pipelines to implement actual business logic steps.

Transitions between pages, whether the pages are presentation nodes or action nodes, are driven by the occurrence of a series of events such as "begin," which specifies a starting page that is typically the home page; "end," which optionally specifies an ending page; "link," which represents the selection of a hyperlink; "button," which represents the submission of an HTML form; "success," which represents successful execution of an input processor or pipeline and that success string was returned; and "exception," which represents an unsuccessful execution of an input processor or pipeline, and issues an exception or failure message.

The begin and end events typically point to the first and the last page of a Web site. Usually the begin event points to the home page. When the system first boots up the begin event is triggered and any webflow transitions included in that begin event are invoked by the page pointed to by the begin event. The link events allow the webflow to handle transitions between pages due to a hyperlink selection by the user, for example, the clicking on a link in a web page. To declare a link event in the webflow properties file the following syntax is used:

```
originPage.link(linkName) =destination
Wherein,
originPage:     = *.jsp| *.html | *.htm
linkName:       = nameUsedInOriginPage
destination:    = *jsp| *.html | *.htm | inputProcessor | pipeline
```

This is only one part of the overall equation—the origin page, i.e., the web page in which the user is interacting, must also notify or invoke the webflow whenever a link event occurs. The following syntax is used to notify the webflow of a link event in an HTML page:

```
<A HREF="/application/commercewf?
    origin=originPage&
    event=link (linkName) ">someText</A>
Wherein,
originPage:     = *.jsp | *.html | *.htm
linkName:       = nameUsedInPropertiesFile
someText:       = hyperLinkText
```

Button events are used to handle requests generated by the user when submitting HTML forms. These forms are typically found on Web sites on pages in which a user is requested to press a button, or to click on a link, in order to forward registration information to an e-commerce business service. Button events can be declared within the webflow properties file using the following syntax:

```
originPage.button(buttonName) =destination
Wherein,
originPage:     = *.jsp | *.html | *.htm
buttonName:  = nameUsedInOriginPage
destination:    = *.jsp | *.html | *.htm | inputProcessor | pipeline
```

As before with link events, the origin page, which in this case is the form page containing the button, must be configured to forward the request to the webflow. The following syntax can be used to declare a form that notifies the webflow of input information:

```
<FORM METHOD="POST" ACTION="/application/commercewf">
    <INPUT TYPE=HIDDEN NAME=origin VALUE="originPage">
    <INPUT TYPE=HIDDEN NAME=event VALUE="button
    (buttonName)">
    <INPUT TYPE="SUBMIT" VALUE="submitButtonText">
</FORM>
Wherein,
originPage:     = *.jsp | *.html | *.htm
buttonName:  = nameUsedInPropertiesFile
```

The webflow properties file (webflow.properties) as used in the context of a web server or commerce server directing a Web site's content controls the display of the site's Web pages and initiates execution of the business logic associated with these pages. Generically, each line in the webflow.properties file can be written as:

```
<origin> . [<event>] [(<eventName>)] =<target>
wherein,
<origin>:      = begin | .<extension> | <inputprocessorName>
               | <pipelineName>
<event>:       = link (<linkName>) | button (<buttonName>) |
               success | exception (<exceptionName>)
<target>:      = .<extension> | <inputprocessorName> |
               <pipelineName>
<extension>:   = jsp | html | htm | inputprocessor | pipeline
```

Each line in the webflow.properties file comprises a name/value pair, separated by an equal sign (=). The name consists of the current state and a named event, and the value is a result state. In the webflow properties example shown below, the current state is "firstpage.jsp". The event is a button named "Next", and the result state is "nextpage.jsp".

```
firstpage.jsp.button(next) =nextpage.jsp
```

This webflow properties entry denotes that when a customer clicks the "Next" button from firstpage.jsp, the webflow will load nextpage.jsp. The home page may also be referenced in the webflow.properties file as

```
begin=home.jsp
```

Web pages that may be used with the webflow include .htm, .html, or .jsp files, although it will be evident to one skilled in the art that other types of presentation file and application format can be used while remaining within the spirit and scope of the invention. In addition to the button event shown in the previous example, there is also a link event associated with these file types.

Events can be given unique names because it is likely that a page has multiple events of the same type associated with it (for example both "previous" and "next" buttons on firstpage.jsp, each requiring different result states). Event names can be used to differentiate between these events, as shown below:

```
firstpage.jsp.button(previous) =previouspage.jsp
firstpage.jsp.button(next) =nextpage.jsp
```

In cases where it is desired that all of the Web pages should reach a certain target page, one can substitute a wildcard character (*) for a specific page name in the current state. For example, if customers should be able to reach the home page from every page within the Web site, a line in the webflow.properties file would read:

```
*.jsp.link (home) =home.jsp
```

The webflow configuration, as stored in the webflow properties file, can be dynamically modified to effect dynamic changes to the webflow itself, and thus to the flow of business and presentation logic on the web site. To dynamically modify the webflow, these steps are undertaken:
1. Start a simple text editor like Notepad.
2. Open the webflow properties file.
3. Modify the file as necessary, using the syntax described in the previous sections.
4. Save the modified file.

There is no need to restart the server to view the changes.

Webflow and Web Pages

To utilize the webflow mechanism, the URLs within the Web pages must include information that corresponds to a line in the webflow.properties file. Specifically, the URL must contain a page name and an event that match a current state in the webflow.properties file. So, for example, in the web page the following html text could be embedded:

---
URL Within a <FORM> Tag in the Web Page
<FORM method="post" action="<%=webflowJSPHelper.createwebflow URLpageContext, "login.jsp", button (createUser)", false)%>">

---

The corresponding Line in the webflow.properties file would be:

---
login.jsp.button(createUser) =nextpage.jsp

---

Webflow Search Order

There may be times when a transition in the webflow is missing (that is, no result state has been specified). To prevent any problem from being visible to the customer, the webflow can attempt to resolve missing transitions by searching through several possibilities to locate an alternate flow. These search possibilities are examined by the webflow mechanism in the following order:

- The webflow substitutes the wildcard character for the specific page, input processor, or Pipeline.
- If wildcard substitution fails, the webflow produces a configuration exception relative to where it encountered the missing transition, and uses this as the result state.
- If contextual configuration exceptions do not allow the webflow to continue, the webflow combines the wildcard substitution with a generic exception, which it uses as the result state.
- If the previous attempts fail, the webflow will simply load a configuration error page. The configuration error page can be configured in the webflow.properties file.

The search order attempts to prevent a missing transition in the webflow from interrupting a customer's experience on the Web site. Rather, in the very worst case, the webflow loads the configuration error page. If for some reason this file is missing, a predefined system error page can be used instead.

For example, suppose the webflow mechanism is attempting to locate the missing transition login.jsp.link(home) in the webflow.properties file. The following list illustrates the alternate transitions that may be used by the webflow:

*.jsp.link(home)
login.jsp.error(ConfigurationException)
*.jsp.error(ConfigurationException)
configurationerrorpage The webflow search order is also be performed for input processors pipelines that are missing in the webflow.properties file. The following list illustrates the alternate transitions that may be used by the webflow for a missing transition ShoppingCartIP.inputprocessor.success:

*.inputprocessor.success
ShoppingCartIP.inputprocessor.error(ConfigurationException)
*.inputprocessor.error(Configuration Exception)
configurationerrorpage Similarly, the following list illustrates the alternate transitions that may be used by the webflow for a missing transition ShoppingCartPC.pipeline.success:

*.pipeline.success
ShoppingCartPC.pipeline.error(ConfigurationException)
*.pipeline.error(ConfigurationException)
configurationerrorpage Input Processors States in the webflow.properties file are not restricted to other Web pages. Input processors (IP's) are predefined classes that provide a way to indirectly carry out more complex tasks using the webflow mechanism. Input processors reduce the need to incorporate complex Java code into the sever-based JSPs, and help maintain the separation between presentation and business logic.

The role of input processors is to read data from the HTTP ServletRequest that invokes the webflow, and use this data to create or update Java objects in a pipeline session. In addition to working with this data, some input processors may also validate information supplied by the customer.

Input processors are also declared in the webflow properties file. The following syntax can be used to declare an input processor:

---
begin=/home.html
home.html.link(about) =/CMPAP/solution/about.html
home.html.button(login) =MyLoginIP.inputProcessor
MyLoginIP.inputProcessor=com.commerce..CMPAP.MyLoginIP

---

Input processors are used to examine data and to determine events. If an input processor terminates execution successfully, it should return a success string, or success event, otherwise the input processor should return an exception string. These success and exception strings or events are used to define the flow of pages on the outcome of the execution of the input processor. In particular, the success event allows the webflow to handle transitions between pages due to the successful execution of an input process. A success event may be defined in the webflow properties file using the following syntax:

---
begin=/home.html
home.html.link(about) =/CMPAP/solution/about.html
home.html.button(login) =MyLoginIP.inputProcessor
MyLoginIP.inputProcessor=com.commerce..CMPAP.MyLoginIP
MyLoginIP.inputProcessor.success=/CMPAP/solution/login.jsp

---

Whatever the process method of the input processor, it must return a success string in order to trigger the success event. In one embodiment of the invention, this is as simple as returning the term or string "success" shown by the following example:

```
import javax.servlet.http.*;
public class MyLoginIP implements TargetProcessor{
    public String process(HttpServletRequest req)
        throws ProcessingException {
    System.out.println(req.getParameter("username"));
    System.out.println(req.getParameter("pasword"));
    return "success";
    }
}
```

An exception event can be defined similarly. The exception event allows the webflow to handle transition between pages; due to an unsuccessful execution of an input process. Exception events can be defined in webflow properties file using the following syntax:

```
begin=/home.html
home.html.link(about) =/CMPAP/solution/about.html
home.html.button(login) =MyLoginIP.inputProcessor
MyLoginIP.inputProcessor=com.commerce..CMPAP.MyLoginIP
MyLoginIP.inputProcessor.success=/CMPAP/solution/login.jsp
MyLoginIP.inputProcessor.exception(MyException) =/CMPAP/solution
        /error.jsp
```

Whatever the process method of the input processor it must also issue an exception in order to trigger the exception event. This need not be a pre-defined message such as the string or phrase "success." In one embodiment, any message that is returned other than "success" is treated as an exception. Custom exceptions may be recognized if the code is configured such. For example, in the following listing, the exception returns a message:

```
package com.commerce..CMPAP.CMPAP3;
import com.commerce.webflow.TargetProcessor;
import com.commerce.webflow.exception.ProcessingException;
import javax.servlet.http.*;
public class MyLoginIP implements TargetProcessor{
    public String process (HttpServletRequest req)
                throws ProcessingException {
        ...
        String password=req.getParameter ("pasword")
        if (password.len( ) <8)
            throw new MyException("Password too short");
        return "success";
    }
}
```

This message may then be used to determine custom webflow processing. Many different input processors can be defined for specific business function needs. These input processors may include processors for managing shopping carts, entering shipping information, querying payment information, administering order lists, or customer order histories, and providing sign on mechanisms for users.

Input processors extend the syntax used for JSPs in the webflow.properties file. For example, if one wants to verify that the customer filled in the required form fields for their address before sending the customer to the next page, the ValidateAddress input processor as shown below could be used:

```
Input Processor for Address Validation
####################################
# ValidateAddress input processor
####################################
# Invoke the input processor
addaddress.jsp.button(continue) =ValidateAddressIP.inputprocessor
# Specify the fully qualified class name for the input processor
ValidateAddressIP.inputprocessor=com.commerce.ebusiness.
customer.webflow.ValidateAddressIP
# Specify the result state for successful execution
ValidateAddressIP.inputprocessor.success=selectaddress.jsp
# Specify the result state for unsuccessful execution
ValidateAddressIP.inputprocessor.exception(ProcessingException) =
addaddress.jsp
```

In the first line of this example, a customer who clicks the Continue button causes the flow to be turned over to the input processor called ValidateAddressIP. The second line defines the full class name of the ValidateAddressIP input processor, which will validate the form fields. The third and fourth lines make use of the event types defined for input processors: success and exception. If the validation is successful, the result state indicated by the success event is to load the selectaddress.jsp file. If the validation is not successful, the ValidateAddressIP input processor directs the customer back to addaddress.jsp to make corrections. If execution of an input processor is not successful, different result states identified by more than one exception event may be specified.

In addition to using input processors between JSPs and pipelines, more than one input processor, or chain input processors can be used. In a chaining arrangement, the result state of one successfully executed input processor is used as an input to another input processor.

Developers may customize the site even further, by choosing to create and implement other input processors or define other exceptions for use with input processors. New input processors must implement the InputProcessor interface and must supply an implementation for the process method. The process method accepts an HTTPServletRequest object as a parameter and returns a string (such as success) if execution is successful, as shown in the following method signature:

```
public String process (HTTPServletRequest request) throws
    ProcessingException
```

All input processors must return a ProcessingException exception, or one of its subclasses. To obtain the Processing Exception exception's exception message, the scriptlet shown below can be used:

```
Obtaining the ProcessingException Exception Message
<% String errorMsg =
        (String)request.getAttribute(HttpRequestConstants.
        PIPELINE_MESSAGE) ;
%>
```

Pipelines

A site cannot be truly considered an e-business if it simply displays pages and performs some additional tasks with input processors. A customer's entire experience relies upon the execution of back-end business processes that are related to where the customer is on the site and what the customer is trying to accomplish.

A pipeline is an advanced mechanism that when invoked by the webflow initiates execution of specific tasks related to a business process. For example, if a customer attempts to move to another page on the site but the customer's identifying information should be saved to a database first, a pipeline can be used.

Pipelines are collections of individual pipeline components, which can be either Java objects or stateless session EJBs. Pipeline components are the parts of a pipeline that actually perform the tasks associated with the underlying business logic. When these tasks are complex, pipeline components may also make calls to external services (other business objects).

To successfully carry out business tasks, each pipeline component must read attributes from a pipeline session and if necessary, write modified versions of these attributes back to the pipeline session. pipeline session are available for the life of the HTTP session.

One embodiment of the invention allows pipeline configurations to be stored in a pipeline properties file. A developer can modify this file to change the business logic associated with the Web pages, without having to edit each page individually. Much like the webflow properties file specifies the flow of Web pages presented to a customer, the pipeline properties file (pipeline.properties) specifies the flow of business logic as the customer moves through each page of the site.

The pipeline infrastructure provides the functionality of implementing the business logic determined by the e-commerce application. The pipeline infrastructure typically comprises the following parts: a pipeline, a pipeline property configuration, one or more pipeline components, a pipeline session and a number of pipeline JSP tags.

Figure 5:
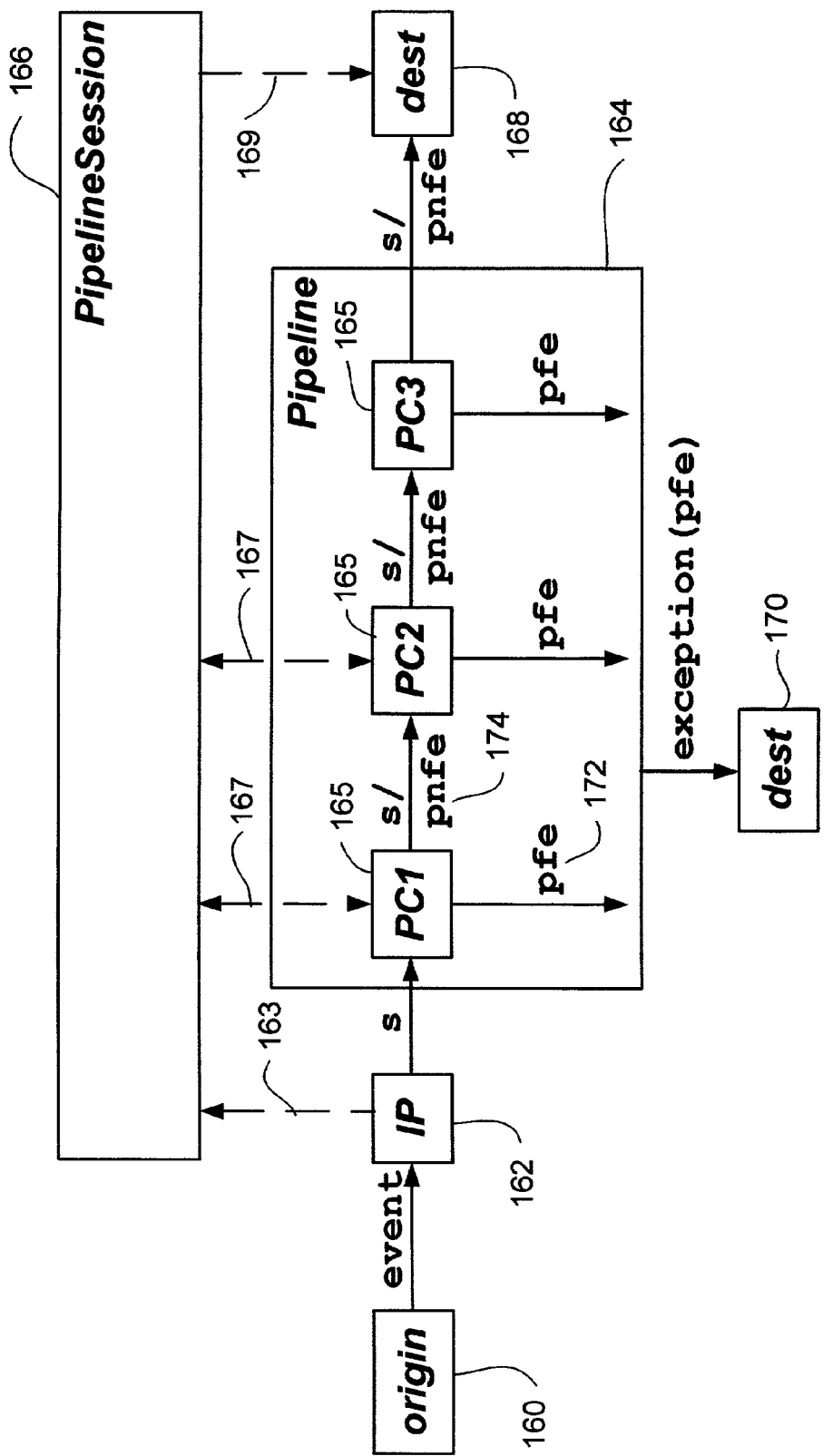
FIG. 5 shows a schematic block diagram of a pipeline diagram in accordance with an embodiment of the invention.

FIG. 5 demonstrates a typical pipeline infrastructure in accordance with an embodiment of the invention. As shown in FIG. 5, data flows from an origin point to a destination point, or a number of destination points, through a pipeline 164. At the same time information about the current session is stored in the pipeline session 166. Depending on the output of the pipeline (i.e. whether the process is a success or not), different destinations may be reached. For example, in the case of FIG. 5, a successful pipeline operation results in the process returning to destination0 168. A failed pipeline process causes an exception and leads to a different destination1 170 being reached. As can be seen in FIG. 5, a pipeline comprises a collection of pipeline components. In one embodiment, pipeline components may be Java classes that implement specialized modular small business logic features or services. The collective functionality of the pipeline groups and pipeline components make up the overall service of the pipeline. In effect, the pipeline components operate together to render the pipeline as a unit of business functionality. Once data enters the pipeline, the pipeline itself decides the output, whether it be a success or an exception, and also what the magnitude of those outputs will be.

While the flow or order of execution within the pipeline is governed by the pipeline itself, the actual flow or order of execution of the pipelines are configured in the webflow properties file. The pipeline name declared in the webflow properties file must match the name declared in the pipeline properties file. An example of syntax used to configure the flow of pipelines is shown below:

```
origin.event=pipelineName.pipeline
pipelineName.pipeline.success=destination1
pipelineName.exception (PipelineFatalException) =destination2
```

In this example, a success of the pipeline causes the webflow to direct the user to destination 1. A failure or an exception causes the user to be directed to destination 2. Pipelines themselves are configured using the pipeline properties file. They may be implemented as either EJB components or Java classes. Although pipelines serve as important business functionality, it will be evident to one skilled in the art that the webflow mechanism may be used independently of the pipeline mechanism.

Pipeline components, herein after referred to as "PC's", can be modular Java classes that form part of the pipeline. The pipeline components implement the business logic exhibited by the pipeline. Pc's provide a well defined self contained service that can be used in conjunction with other PC's in a given pipeline. The results of the pipeline or pipeline component as it executes the business logic is shared with others through the use of the pipeline session. Pipeline components use "set attribute" and "get attribute" methods to bind local objects within the pipeline session. Other web components may also share this information in the pipeline session. The syntax of the set and get methods is shown below:

```
void setAttribute(String attributeName, Object attribute);
Object getAttribute(String attributeName);
```

Figure 6:
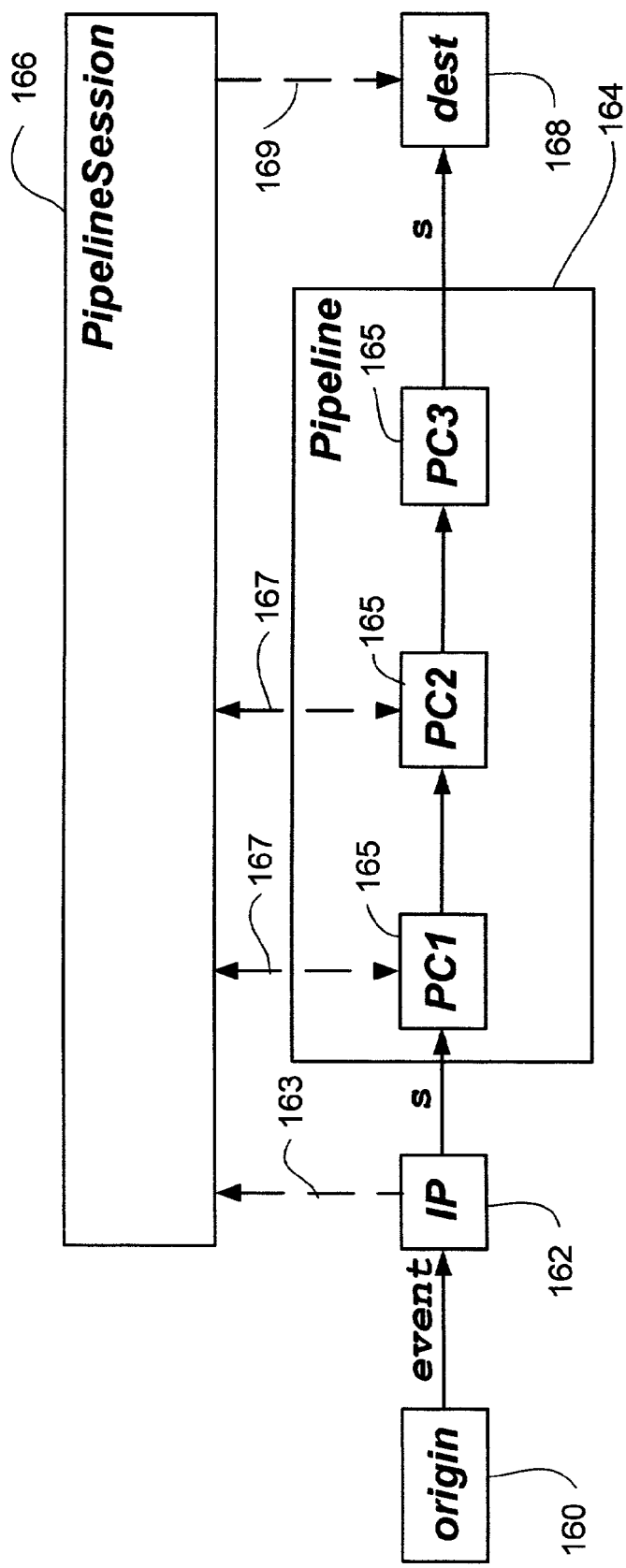
FIG. 6 shows another schematic block diagram of a pipeline diagram in accordance with an embodiment of the invention.

FIG. 6 illustrates a pipeline session initialization process. The pipeline session is usually initialized by an input processor IP. Input processors are used to preprocess and to validate data before the business logic itself is executed. Pipeline JSP tags are used to access the content of a pipeline session using a special tag library. The syntax of a pipeline tag used to access the pipeline session properties is given below:

```
<prefix:getPipelineProperty
    propertyName="propertyName"
    returnName   ="variableName"
    returnType   ="variableType"/>
```

In this example, the tag retrieves a property name. The property name stores it in a variable having a variable name and a type variable type. Similarly to input processors pipelines return results. Typically this result will be either a success or an exception. A success usually results in the pipeline performing some business function. An exception usually results in an abort or a failure to perform that business function. In one embodiment, pipeline components can throw three exceptions, either a non-fatal exception, a fatal exception, or a remote exception. Fatal exceptions, hereinafter referred to as PFE, are thrown by a pipeline component and causes the whole pipeline to fail. The pipeline itself generates an exception event if any of its PC's throw a PFE. On the other hand, pipeline exceptions which are non-fatal, do not cause the whole pipeline to fail. In a non-fatal pipeline exception, one pipeline component causes the exception. But the pipeline itself continues. Pipelines themselves do not generate an exception event when a single PC throws a PFNE. Returning to FIG. 5, the pipeline therein shows what happens when a PFE or PFNE is returned. Within the pipeline 164 a number of pipeline components are shown. A PFE 172 resulting from any of these pipeline components causes an exception to be thrown by the pipeline overall. A PFE, alternatively, does not result in an overall pipeline exception, but causes the pipeline to continue to its final destination 168.

Generically, pipeline definitions can be written as:

```
<pipelineName>.componentList
<pipelineName>.isTransactional=<true | false>
``` where componentList is a comma-separated list of pipeline components to be executed in sequence. Once all pipeline definitions are complete, the developer must specify definitions for each pipeline component in the pipeline. Each pipeline component definition consists of three properties: className which specifies the Name of the class that implements the pipeline component, jndiName which specifies the name of the session bean that implements the a pipeline component, and is EJBSessionBean which Specifies whether or not the pipeline component is a session bean.

The pipeline.properties file contains pipeline definitions, which include:

A pipeline name.

A list of its associated pipeline components in order of execution.

A value for the is Transactional pipeline property, indicating whether or not all the pipeline components in the pipeline will participate in a transaction.

The following is a pipeline definition that might be used in the pipeline.properties file:

```
orderPipeline=CalculateTaxPC,CalculateDiscountPC,TotalCartCostPC
orderPipeline.isTransactional=true
```

In this example, a pipeline called orderPipeline consists of three pipeline components (CalculateTaxPC, CalculateDiscountPC, TotalCartCostPC). The orderPipeline is also transactional. The corresponding pipeline component definitions that might be used in the pipeline.properties file are shown below.

```
CalculateTaxPC.classname=com.commerce.ebusiness.order.
    pipeline.CalculateTaxPc
CalculateTaxPC.isEJBSessionBean=false
CalculateTaxPC.jndiName=
CalculateDiscountPC.classname=com.commerce.ebusiness.order
    .pipeline.CalculateDiscountPC
CalculateDiscountPC.isEJBSessionBean=false
CalculateDiscountPC.jndiName=
TotalCartCostPC.classname=com.commerce.ebusiness.order
    pipeline.TotalCartCostPC
TotalCartCostPC.isEJBSessionBean=true
TotalCartCostPC.jndiName=com.commerce.ebusiness.order.
    pipeline.TotalCartCostPC
```

Like the webflow, the pipeline configuration, as stored in the pipeline properties file, can be dynamically modified to effect dynamic changes to the pipeline itself. To dynamically modify a site's pipelines, these steps are used:

1. Start a simple text editor like Notepad.
2. Open the pipeline properties file.
3. Modify the file as necessary, using the syntax described in the previous sections.
4. Save the modified file.

The server does not need to be restarted for the changes to take effect.

The pipeline.properties file provides an easy way to eliminate pipeline components without the need for advanced programming skills. For example, a devlper might want to eliminate a pipeline component that performs your tax calculations in a CommitOrder Pipeline. The definition in a default pipeline.properties file for a CommitOrder Pipeline is shown below:

```
# CommitOrder
CommitOrder.componentList=CommitOrderPC, AuthorizePaymentPC,
TaxCalculateAndCommitLineLevelPC
```

To eliminate a pipeline component, these steps are followed:

1. The pipeline.properties file is opened and each reference to the pipeline component to be eliminated is removed. For example, if tax calculations are not required, then all tax calculation pipeline components are removed from the pipeline definition, as shown below:

```
# CommitOrder
CommitOrder.componentList=CommitOrderPC, AuthorizePaymentPC
```

2. If necessary, the related JSPs are edited to eliminate places in the user interface where the information is gathered.
3. If in step 2 an entire JSP was removed, the developer must open the webflow.properties file and change any reference (s) to bypass it.

The pipeline.properties file also provides an easy way to modify the sequence of pipeline components, without the need for advanced programming skills.

To reorder a pipeline component, the pipeline.properties file is modified to change the order that the pipeline components are listed in the pipeline definition.

Using the same CommitOrder Pipeline example, if one wanted to authorize the payment after calculating the tax instead of before it (as in the default OrderCommit Pipeline), one could use the following entry:

```
# CommitOrder
CommitOrder.componentList=CommitOrderPC,
TaxCalculateAndCommitLineLevelPC, AuthorizePaymentPC
```

Pipelines in the Webflow

Figure 7:
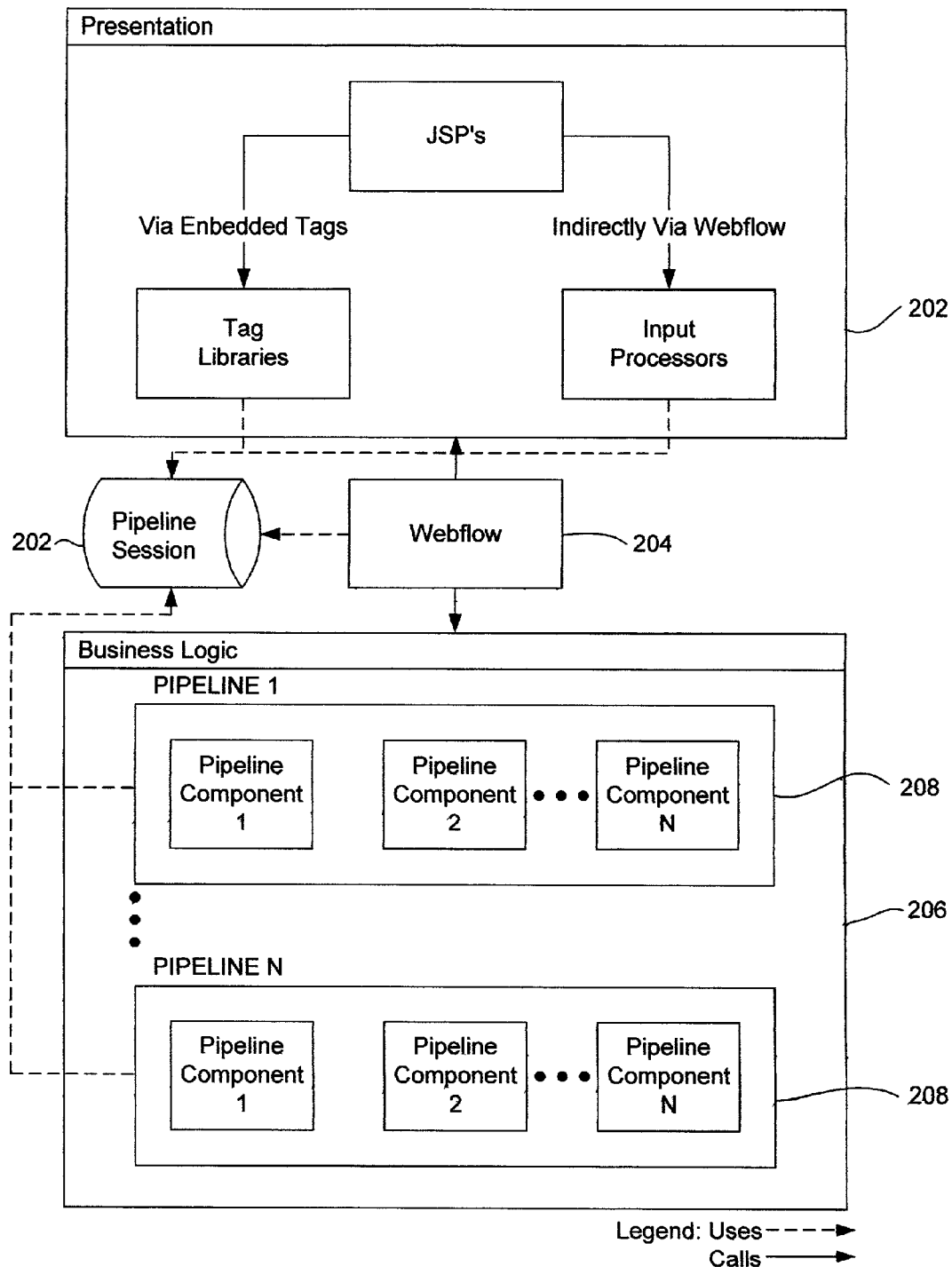
FIG. 7 shows a schematic block diagram of a webflow/pipeline embodiment of the invention.

FIG. 7 illustrates how the various technology categories interact to preserve the Commerce Server design model and is essential to understanding how to customize and extend the webflow and pipeline mechanisms.

Pipelines can be used in the webflow.properties file to initiate execution of the business logic required for a particular page. Each pipeline must first be invoked by the webflow, and then followed by a success and exception path.

For example, if a customer were to submit their order for processing, the orderPipeline might be represented in the webflow.properties file as shown below:

```
shoppingcart.jsp.button(submit) =orderPipeline.pipeline
orderPipeline.pipeline.success=commitorder.jsp
orderPipeline.pipeline.exception(PipelineFatalException) =
    shoppingcart.jsp
```

The first line indicates that when a customer clicks on the Submit button, the webflow will turn control over to the pipeline called orderPipeline. If the pipeline executes successfully (that is, if each component in the pipeline executes without error), the second line sends the customer to a page that allows the customer to commit the order. If the pipeline does not execute successfully, the third line specifies the exception and directs the customer back to the shopping cart page.

To customize a site even further, a developer might choose to create and implement custom pipelines or define custom exceptions for use with pipelines.

The webflow and pipelines are designed for easy extensibility. For example, if organizational requirements dictate the use of a new business process, a Java/EJB programmer can utilize the existing webflow and pipeline infrastructure to create and incorporate these components into the system.

Although pipelines and their components are reusable, they must relate to a particular customer's experience on the e-commerce site to make their execution relevant. For this reason, pipeline components always operate on a pipeline session.

Pipeline sessions are used to keep track of information gathered from customers and the data modified by pipeline components as a customer moves through the site, and to maintain this state of the business process. A pipeline session is an object that is created and stored within the HTTP session, with the goal of providing a single point of communication for all pipeline components in a given pipeline. Additionally, pipeline sessions provide central access and storage for all external classes that may also need to update the pipeline session.

The pipeline session is comprised of many name/value pairs called attributes. Pipeline components act on particular attributes that exist within the pipeline session, and may also add new attributes as necessary.

The pipeline session provides an API that allows a developer to add pipeline session attributes. All attributes in the pipeline session can have one of two scopes: pipeline Session scope or Request scope. The method signature for creating pipeline session attributes is:

```
public void setAttribute(String key, Object attribute, int scope);
``` where the value scope is given as either PipelineConstants.PIPELINE_SESSION_SCOPE or PipelineConstants.REQUEST_SCOPE.

In the pipeline Session scope, the attribute exists in the pipeline session until the end of the current HTTP session. In the Request scope, the attributes are made available in the HTTPServletRequest, and these attributes should be accessed via the getPipelineProperty JSP tag (that is, the attributes exist only for the life of an HTTP request).

Pipeline Session and Request scoping differ by how long the attribute is retained. When an attribute is specified with the Request scope, it is available from the time it is set, up to and including the display of the next JSP. The attribute is automatically deleted when a new request starts. Therefore, Request scope is useful for temporary objects that are only needed for one page, for example, search results from the product catalog are stored as Request-scoped attributes. Attributes that may be longer lived can be specified as pipeline Session scope, which cause them to be retained throughout the customer's session. If a pipeline session attribute is only required for the current request, then Request scope can be used.

Each time the pipeline session is updated, the HTTP session can be updated so that the pipeline session is replicated across all the nodes in a cluster environment.

In addition to using the pipelines and pipeline components provide a developer may create their own pipelines and pipeline components. New pipeline components must implement the pipelinecomponent interface and must supply an implementation for the process method. The process method accepts a pipelinesession object as a parameter, and returns updated pipelinesession objects if the execution is successful, as shown in the following method signature:

```
public PipelineSession process (PipelineSession session) throws
RemoteException, PipelineNonFatalException, PipelineFatalException
```

Pipeline Component Exceptions

Pipeline components may issue a PipelineFatalException to signify that the component has failed. When this occurs, no further pipeline components are executed and if the pipeline is transactional, the transaction will be rolled back. To obtain the PipelineFatalException exception's exception message, the scrip shown below can be used:

```
Obtaining the PipelineFatalException Exception Message
<% String errorMsg = (String) request.getAttribute
    (HttpRequestConstants.PIPELINE_MESSAGE); %>
```

Pipeline components may also issue a PipelineNonFatalException to indicate that the component has failed, but that subsequent pipeline components should be executed. A pipeline component may also issue a RemoteException. The webflow integrates with these exceptions as follows:

PipelineFatalException: If any component in a pipeline issues a PipelineFatalException or a class derived from PipelineFatalException, besides aborting the pipeline and the transaction, the webflow will perform an exception search on the exception thrown.

RemoteException: If the pipeline issues a RemoteException, it is treated as a server error and the servererror.jsp is displayed.

When an exception search is performed, the webflow looks for the exact exception found as the event. If this exception is not found, the webflow begins looking through the search order.

Pipeline components can be implemented as either stateless session EJBs or as Java objects. An implementing class that is a stateless session EJB must meet the following requirements:

It must declare and implement a create( ) method in the bean's Home interface that takes no arguments and returns the appropriate Remote interface.

It must declare and implement the process( ) method as part of its Remote interface.

Stateful Versus Stateless Pipeline Components

Whether pipeline components are implemented as stateless session EJBs or as Java objects, pipeline components themselves should be stateless. The business logic implemented in pipeline components should only depend upon the PipelineSession object, the database, and other external resources. Should a developer define any instance variables, static variables, or static initializers within a pipeline component, the results may be unpredictable.

Transactional Versus Non-Transactional Pipelines;

If all pipeline components within the pipeline will be invoked under one transaction, the respective pipeline's is Transactional property should be set to true in the pipeline definition (within the pipeline.properties file). Transactional pipelines provide support for rolling back the database transaction and for making changes to the pipeline session. If a transactional pipeline fails, any database operations made by each of its pipeline components are rolled back. If a pipeline component in a transactional pipeline is implemented as a stateless session EJB, then its transaction attribute must be Required. Also, each of the pipeline components in a transactional pipeline must have the correct transaction flag. Transaction flags indicate whether or not each bean will participate in the transaction. If the pipeline's is Transactional property is true and the participating pipeline components (beans) have their transaction flag set to never, then the pipeline may fail to execute. Similarly, if the pipeline's is Transactional property is false and the pipeline components have the transaction flag set to mandatory, the pipeline may also fail to execute. If a pipeline component in a transactional pipeline is implemented as a simple Java object, then for all database operations, the pipeline component must use the Transactional DataSource associated with the connection pool, as defined in the weblogic.properties file. A transactional pipeline containing pipeline components implemented as simple Java objects commits the transaction upon success, and rolls back the transaction upon failure.

Session Timeouts

In any Web application, the HttpSession is usually short-lived. Therefore, every time the HttpSession is accessed, it must be evaluated to determine whether the session is new or whether the client has joined the current session. If the session is new and an attempt is made to access the PipelineSession from the HttpSession, then a null value will be returned unless it is recreated.

As part of handling session timeouts, each class that implements the PipelineComponent interface should determine whether or not a required attribute exists in the PipelineSession object. If the attribute does not exist, the subclass should throw an InvalidPipelineSessionStateException exception.

Webflow and Pipeline JSP Tags

An embodiment of the invention provides JSP tags specifically related to the webflow and pipeline mechanisms.

The webflow JSP tags are utility tags that simplify the implementation of JSPs that utilize the webflow mechanism. To import the webflow JSP tags, the following code may be used:

```
<%@ taglib uri="webflow.tld" prefix="webflow" %>
```

The getValidatedValue tag is used in a JSP to display the fields in a form that a customer must correct. The attributes that can be used with the getValidatedValues JSP tag include:

fieldName: The name of the field for which the status is desired.

fieldValue: The current value of the field as set by a previous invocation of the page fieldStatus: The processing status of the field, which may be unspecified, invalid, or valid.

These fields are determined and marked by an input processor after performing its validation activities. All InputProcessors use a ValidatedValues object to communicate which fields were successfully processed as well as those that were determined to be invalid.

ValidatedValues Java Class

The ValidatedValues class allows a Java/EJB programmer who writes an InputProcessor to report the status of processed form fields back to the commerce engineer/JSP content developer. The constructor for the ValidatedValues class takes an HTTPSession as a parameter, as shown in the following method signature:

```
public ValidatedValues (javax.servlet.http.HttpSession s)
```

The public methods used to convey the status of the validation through the getValidatedValue JSP tag include:

public String getStatus (String name): Retrieves the status for the specified field, which may be unspecified, invalid, or valid.

public void setStatus (String name, String value):Sets the status for the specified field.

public String getvalue (String name): Retrieves the current value for the specified field.

An example of how one might use the getValidatedValue tag is shown below. When used in a JSP, this sample code will obtain the current value and processing status of the <field_name> form field.

```
<webflow:getValidatedValue fieldName="<field_name>"
    fieldValue="<field_value>" fieldStatus="status" />
```

The pipeline JSP tags are used to store and retrieve attributes in a pipeline session. To import the pipeline JSP tags, the following code can be used:

```
<%@ taglib uri="pipeline.tld" prefix="pipeline" %>
```

The getPipelineProperty JSP tag retrieves a named attribute (property) from the pipeline session object, from a property of one of the objects that has been retrieved from the pipeline session, or from the request. The attributes that can be used with the getPipelineProperty JSP tag include:

attributeScope: Scope of the attribute to locate. (PipelineConstants.PIPELINE_SESSION_SCOPE or PipelineConstants.REQUEST.SCOPE)
pipelineObject: Name of the object in the pipeline session in which to locate the specified attribute.
propertyName: Name of the attribute to locate.
returnName: Name of the variable that will contain the value of the attribute.
returnType: A valid type for the returned attribute.

An example of how a developer might use the getPipelineProperty tag is shown below. When used in a JSP, this sample code will retrieve an attribute named <property_name> and store it in a variable named <return_name>. The type of this variable will be <return_type>, and the scope to which this attribute belongs is specified by <attribute_scope>.

```
<pipeline:getPipelineProperty propertyName="<property_name>"
    returnName="<return_name>" returnType="<return_type>"
    attributeScope="<%=<attribute_scope>%>"/>
```

The setPipelineProperty JSP tag sets a named attribute (property) to the pipeline session object or to a property of one of the objects that has been retrieved from the pipeline session. The attributes that can be used with the setPipelineProperty JSP tag include:
pipelineObject: Name of the object in the pipeline session in which to set the specified attribute.
propertyName: Name of the attribute to set.
propertyValue: Value of the attribute to set.

If pipelineObject is not specified, then the given property and its value will be set to the pipeline session. If the pipelineObject is specified, then the object must implement the set<PropertyName>( ) method, which takes two parameters: a property name (String) and a property value (Object), as shown in the following method signature:

```
public void set<PropertyName>(String propertyName,java.lang.Object propertyValue);
```

If the set<PropertyName>( )method is not implemented, an exception will be thrown during the processing of the JSP that has the setPipelineProperty tag in it.

An example of how one might use the setPipelineProperty tag is shown below. When used in a JSP, this sample code will set the property named <property_name> of the <pipeline_object_name> with the value specified in <property_value>.

```
<pipeline:setPipelineProperty propertyName="<property_name>"
    propertyValue="<property_value>"
    pipelineObject="<pipeline_object_name>"/>
```

Web Site Implementation

Figure 8:
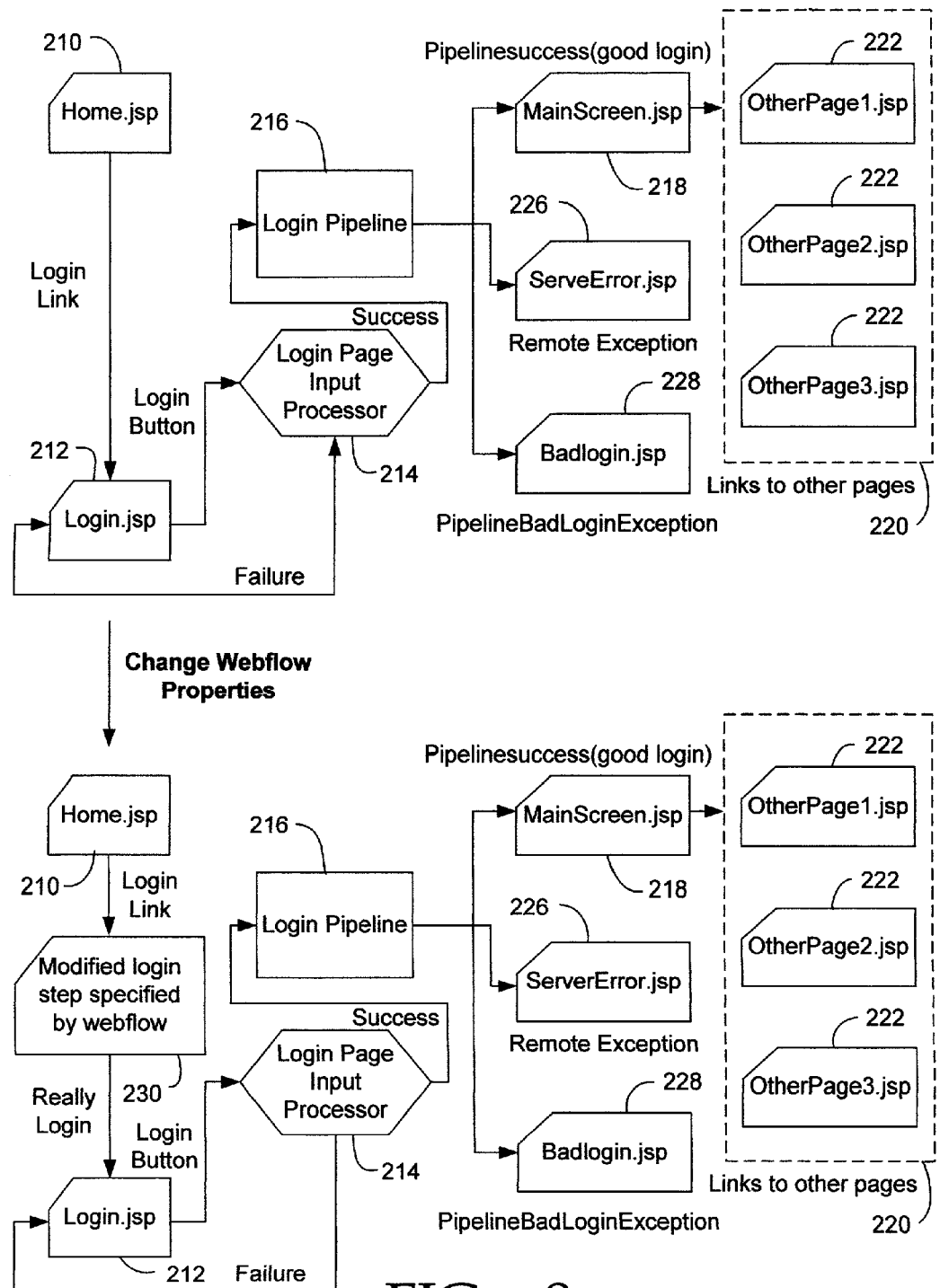
FIG. 8 shows a schematic of a login application which includes an embodiment of the invention.

FIG. 8 illustrates a simple example of how the webflow may be used in a Web site implementation to modify the flow of the Web site logic. As shown in FIG. 8, the webflow initially causes the user to flow from a home page 210, through a login servlet 212, an input processor 214, and a pipeline 216 to a series of other Web pages 222. The pipeline 216 includes a number of paths 218, 226, 228 depending on the success (or not) of the login. By simply modifying the webflow properties file, a developer can aid an additional module or step, for example an additional login verification step 230, without modifying any of the actual underlying HTML or JSP code. In this manner the business logic of the Web site is changed in a fundamental way, without requiring any change in the code, and without requiring any downtime.

FIGS. 9, 10, 11, 12, 13, 14, 15, 16, 17 and 18 illustrate a more detailed example of the use of a webflow properties file together with a link and a button event to create a simple Web site. In this example the Web site comprises three web pages: home.html, about.html and login.html.

Figure 9:
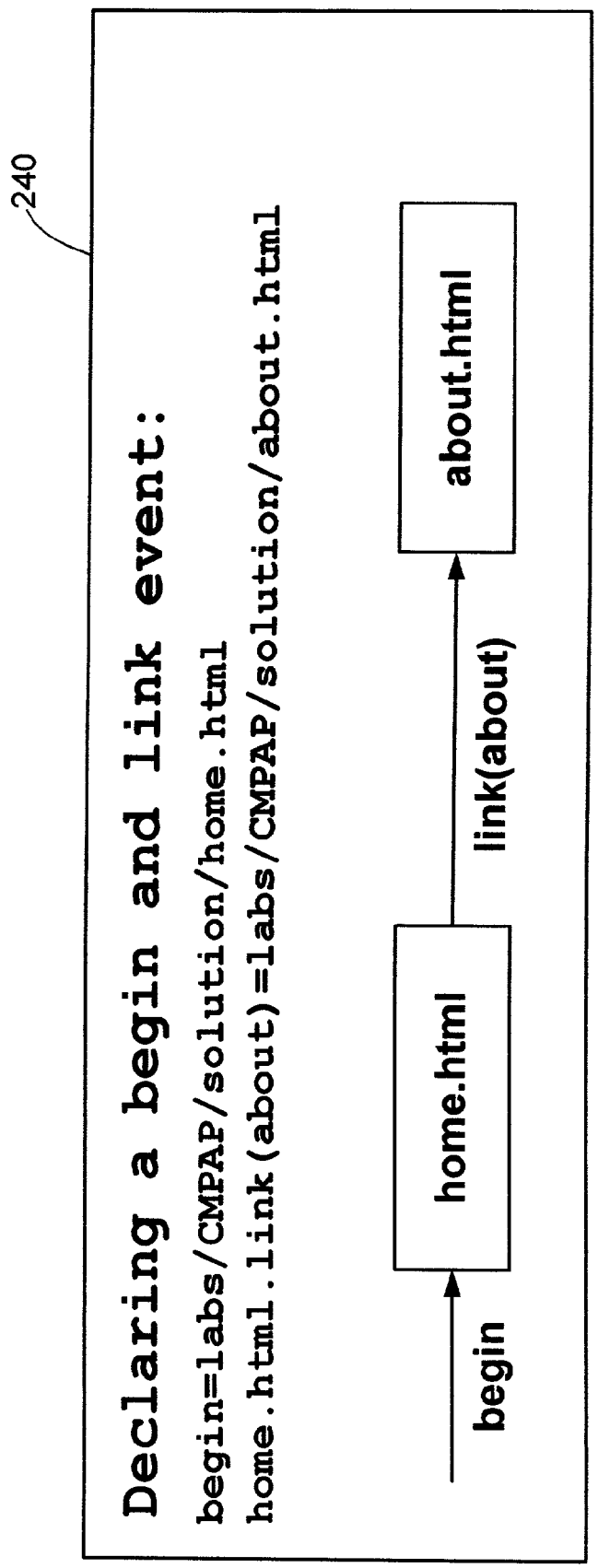
FIG. 9 shows steps in the creation of a Web site having a webflow in accordance with an embodiment of the invention.
Figure 10:
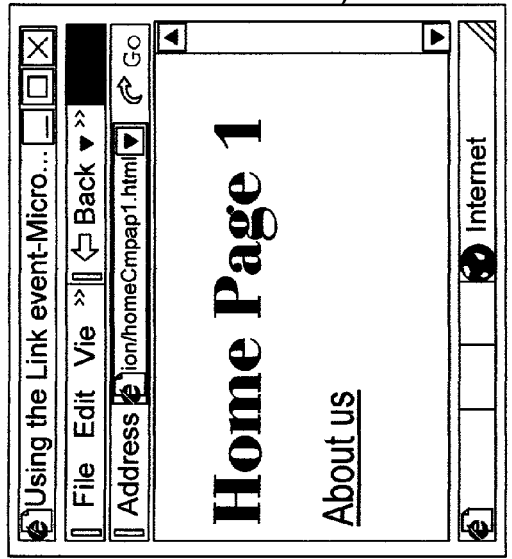
FIG. 10 shows additional steps in the creation of a Web site having a webflow in accordance with an embodiment of the invention.

The first step illustrated in FIG. 9 is to declare a begin event that points to the home page. Following this, a link event called about is used to transition between the home.html and the about.html page. The HTML code representing the home page must also be modified to declare the link event as shown in FIG. 10. This event is used to call the webflow process to allow the transition to the about page.

Figure 11:
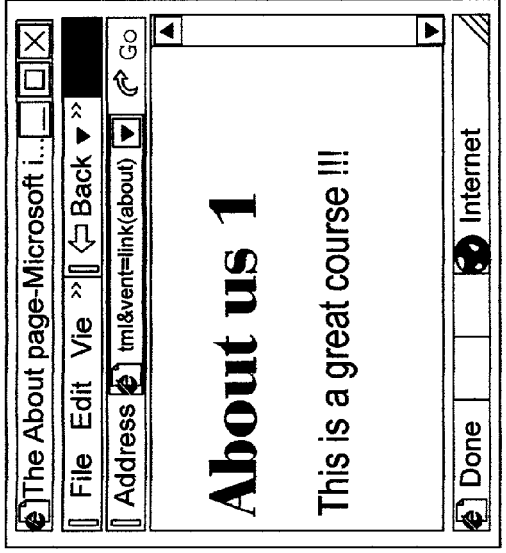
FIG. 11 shows additional steps in the creation of a Web site having a webflow in accordance with an embodiment of the invention.
Figure 12:
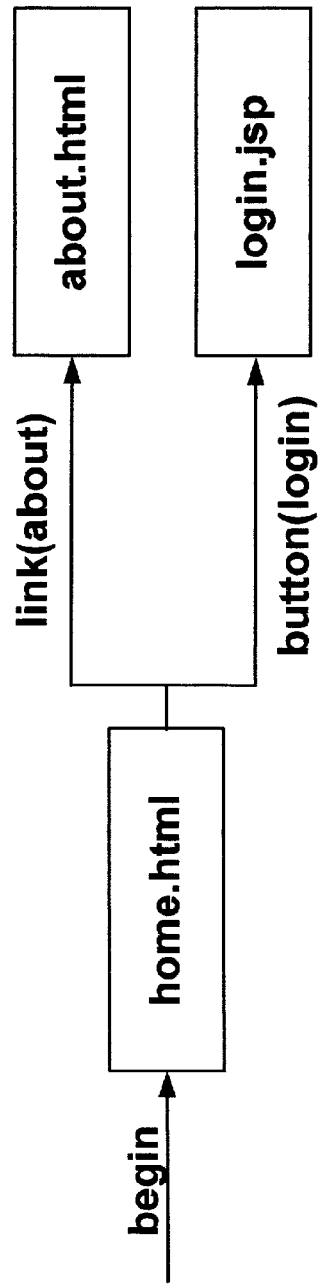
FIG. 12 shows additional steps in the creation of a Web site having a webflow in accordance with an embodiment of the invention.

FIG. 11 illustrates an example of the about page and the code used to show a simple transition between pages using the webflow process. The next step in configuring the example webflow is to add a button event. In this example, as shown in FIG. 12 a button event declaration called login is added to provide a transition from home.html page to the login.html page. The button events must be triggered by modifying the HTML code on the home page to invoke the webflow mechanism whenever the button is depressed.

FIG. 13 illustrates an example of the home page together with the login button in showing the call to the webflow application, "commercewf".

Figure 14:
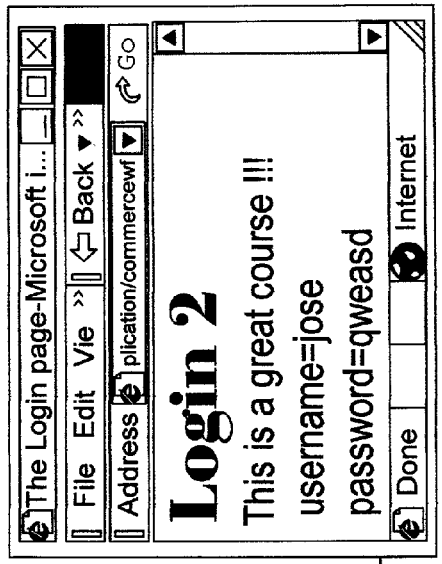
FIG. 14 shows additional steps in the creation of a Web site having a webflow in accordance with an embodiment of the invention.

FIG. 14 illustrates a login page, which in this example is a JSP that has an access to the HTML request parameters through a request object. It can be seen in this example that the webflow process decides in each instance what the transition should be. The home page itself does; not reference the about page, ie links do not need to be hard coded into the home page. The home page merely informs the webflow that a link event named about has occurred in the page. The webflow then decides what the transition should be. The developer of the e-commerce site can change the order of the pages by maintaining the webflow properties file. No HTML coding is needed to change the flow of logic between to verify the login password. In this example, if the password is less than eight characters the input process or throws an exception and the webflow transitions to an error page.

Figure 15:
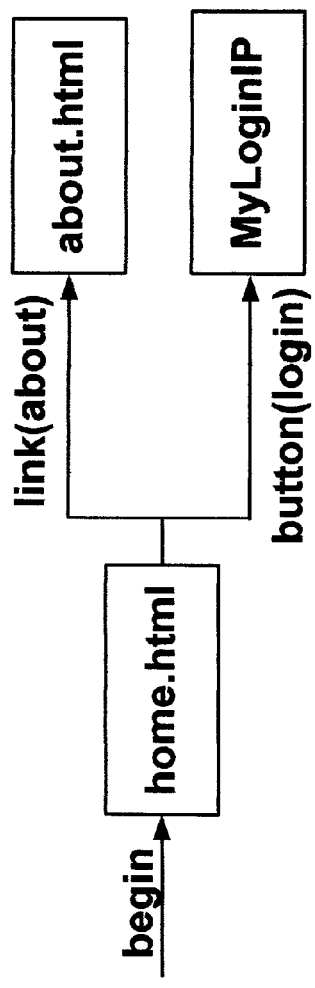
FIG. 15 shows additional steps in the creation of a Web site having a webflow in accordance with an embodiment of the invention.
Figure 16:
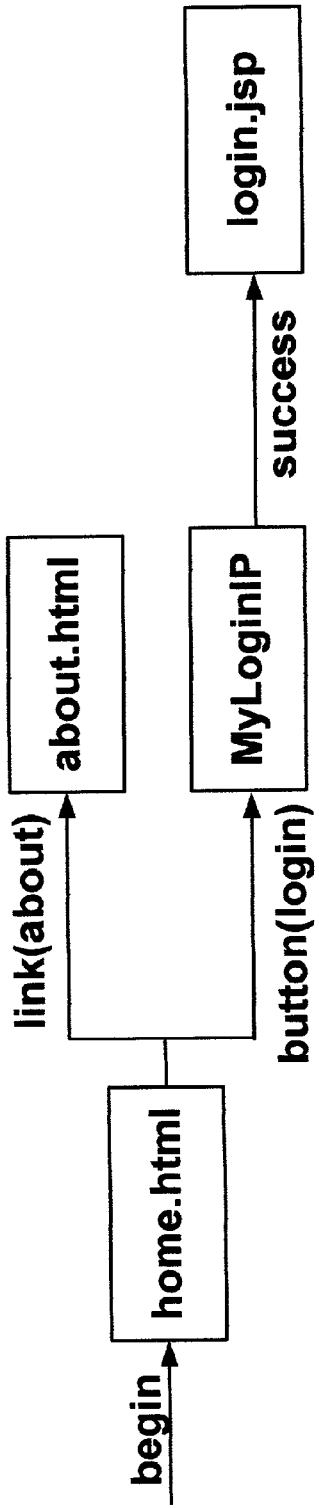
FIG. 16 shows additional steps in the creation of a Web site having a webflow in accordance with an embodiment of the invention.

The first step in the process is illustrated in FIG. 15, in which an input processor called MyLoginIP is declared in the webflow properties file. A success event is then also defined in the webflow properties file that transitions to the login .JSP page upon successful login, as shown in FIG. 16.

Figure 18:
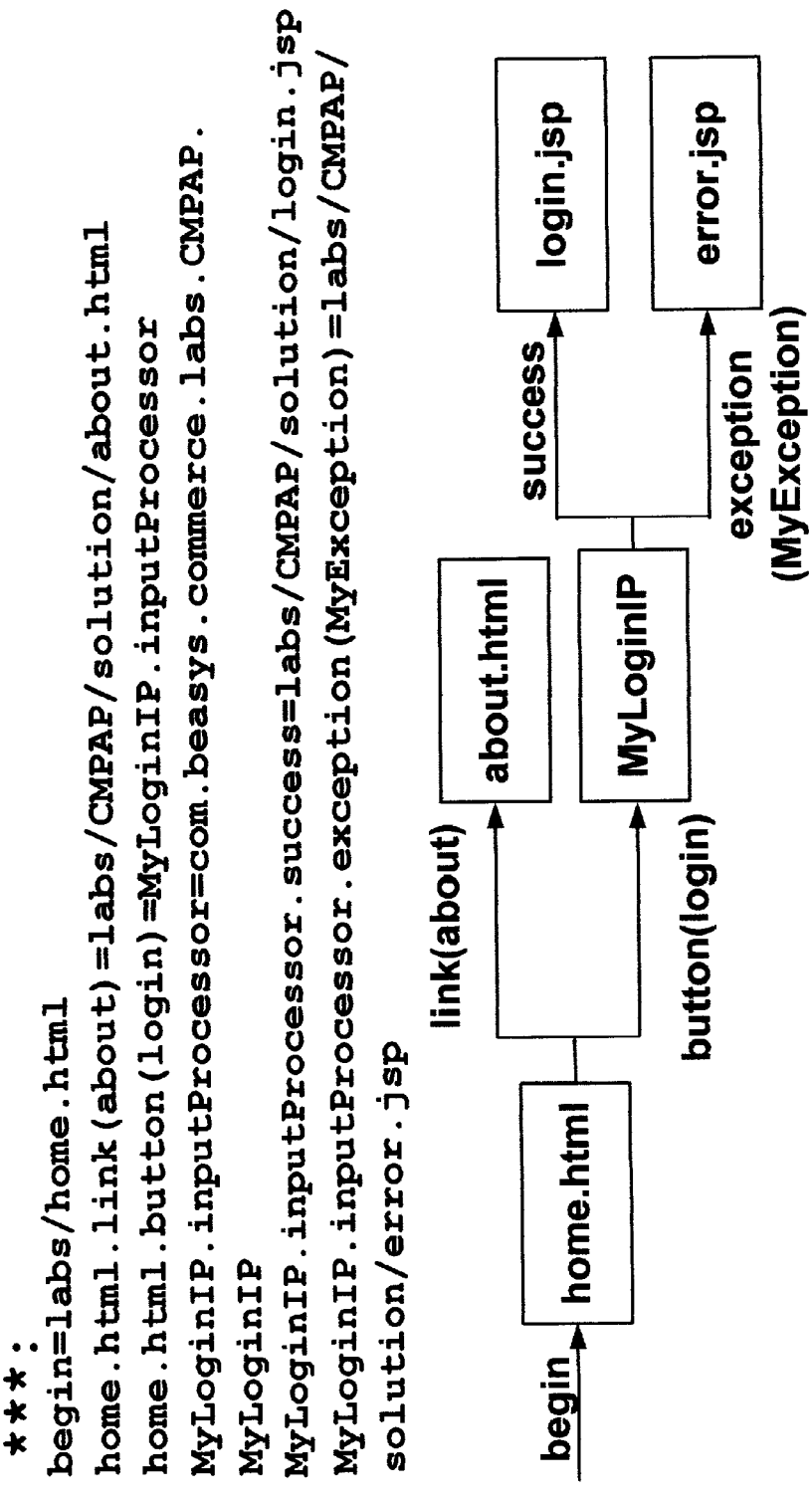
FIG. 18 shows additional steps in the creation of a Web site having a webflow in accordance with an embodiment of the invention.

As shown in FIG. 17, this success event is triggered whenever the input processor returns the string "success". FIG. 18 illustrates the mechanism by which an exception event can be added to the web page. In this case an exception event is added to handle exceptions thrown by the input processor.

Figure 20:
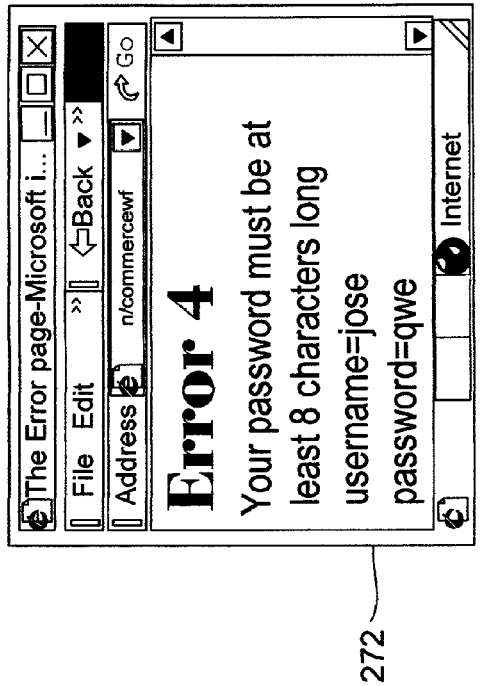
FIG. 20 shows additional steps in the creation of a Web site having a webflow in accordance with an embodiment of the invention.

As shown in FIGS. 19 and 20, the webflow will transition to the error page when the input processor throws an exception. In this case the user is presented with an HTML page that indicates an error has occurred and gives the user some additional information to enable them to rectify the error.

FIG. 21 illustrates how this simple web page can be expanded to include a pipeline application. In this example the pipeline application comprises an order form that gathers billing information from the client. Form input fields have names such as user name, address, city, state and zip. A first step in this process is to submit the form to validate an input processor (IP) for validation. The input processor validates the fields, retrieves a pipeline session and populates the pipeline session with the attributes passed to it by the form.

FIGS. 22,23,24 and 25 illustrate the additional steps needed to configure the pipeline process. The success of the input processor triggers the execution of the validate PL pipeline which contains two pipeline components: a validate user pipeline component (validateuserpc), which gets the user name property and validates that the user is registered; and a validate card pipeline component (validatecardpc), which gets the user's credit card number and validates that the card is in fact an authorized one. Successful execution of this pipeline invokes the Java servlet page, validated.JSP. The validate.JSP Servlet imports the pipeline tag library, gets properties from the pipeline session and prints out all the properties and their values. These properties and values are then used to actually process the order.

Invocation Life Cycle

Figure 26:
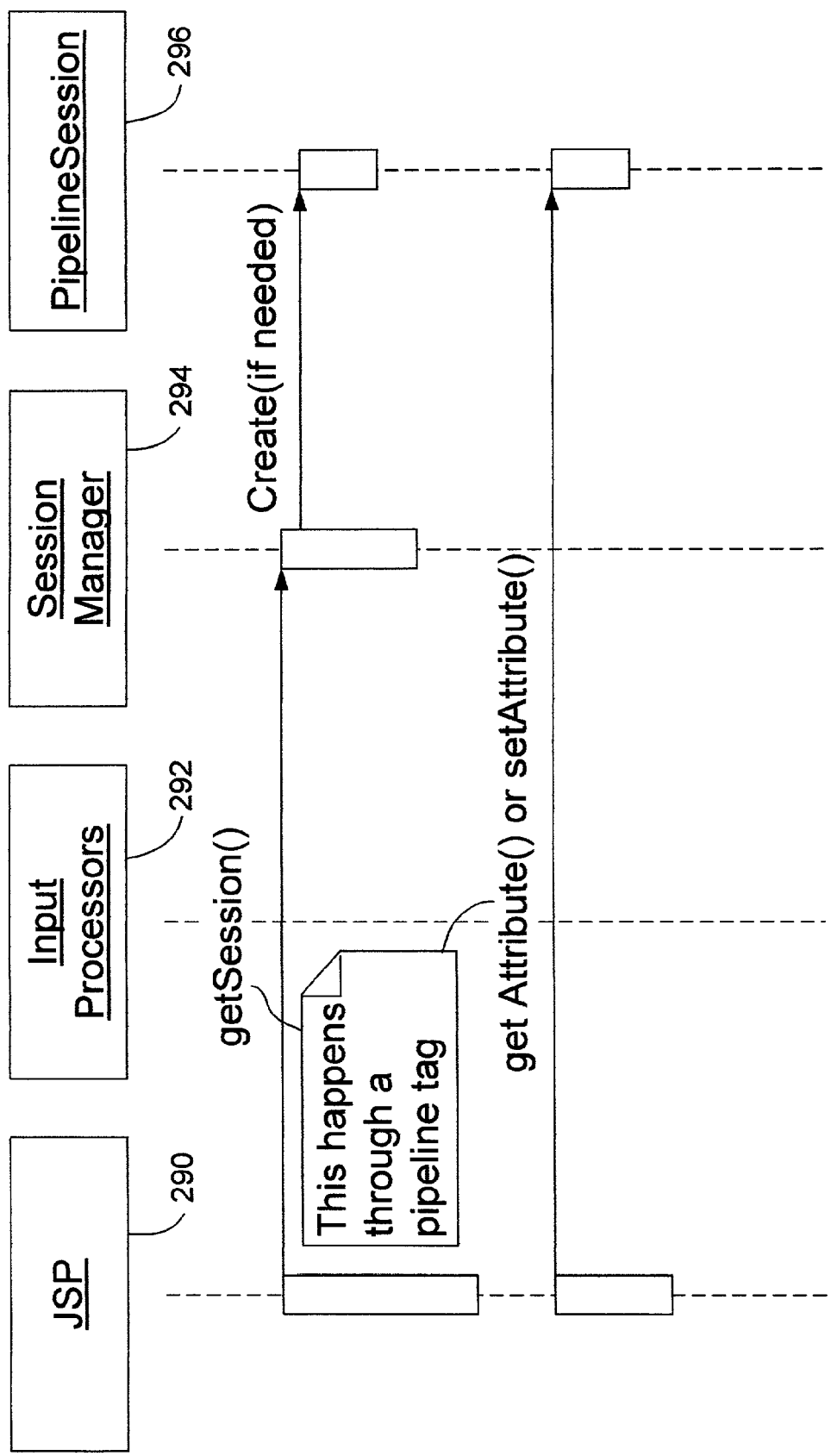
FIG. 26 shows function invocation time-lines in accordance with an embodiment of the invention.
Figure 27:
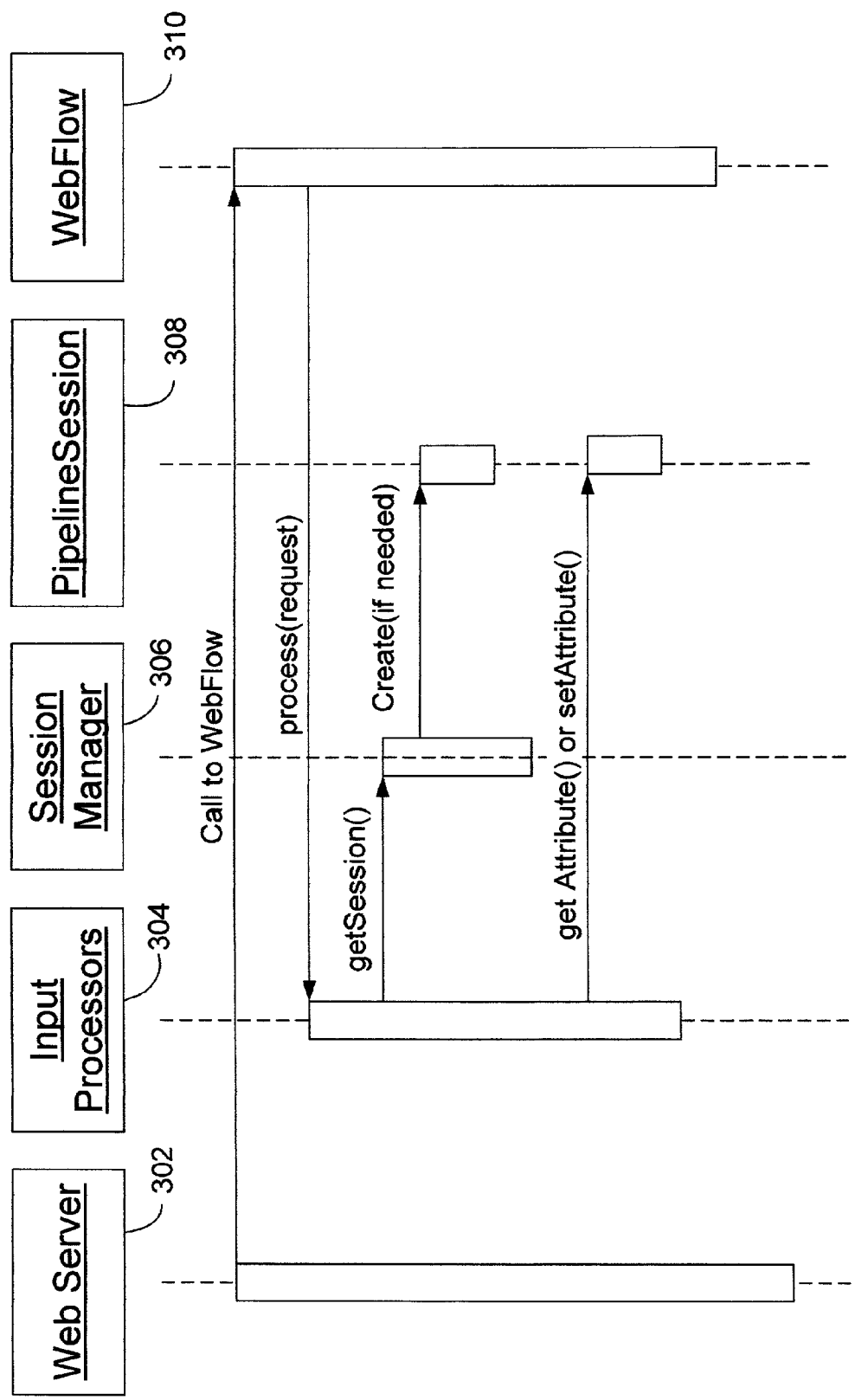
FIG. 27 shows additional function invocation time-lines in accordance with an embodiment of the invention.
Figure 28:
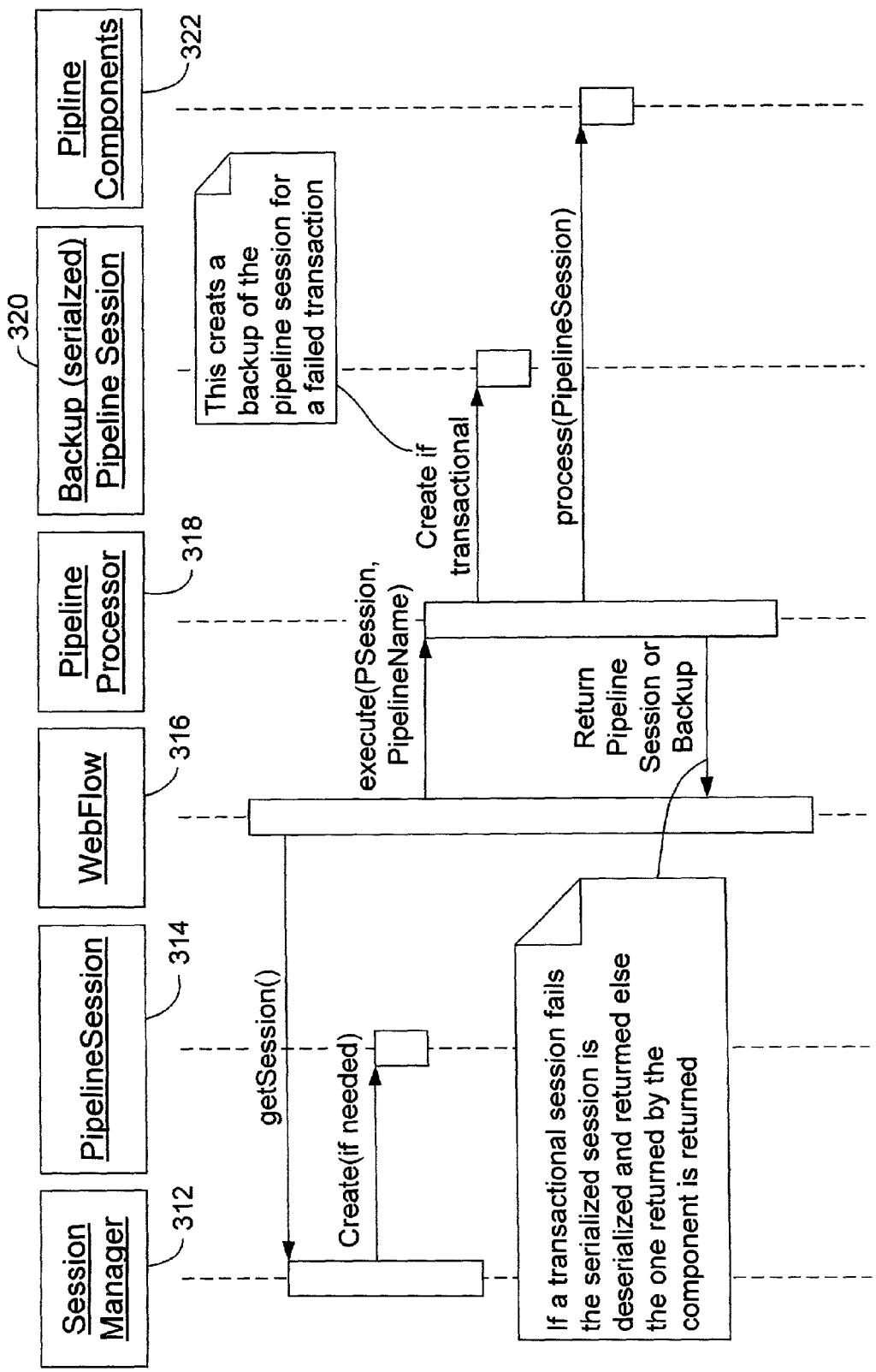
FIG. 28 shows additional function invocation time-lines in accordance with an embodiment of the invention.

FIGS. 26–28 illustrate life cycles for various applications and features in accordance with the invention. FIG. 26 shows the pipeline session life cycle for a JSP page. In FIG. 26, the JSP invokes the session manager, which in turn invokes the pipeline session. The pipeline session may be created if needed. From then on, the JSP interacts directly with the pipeline session through a series of Get attributes or said attribute commands.

FIG. 27 illustrates the pipeline session life cycle for an input processor. In FIG. 27, a web server passes an initial call to the webflow mechanism. The webflow mechanism invokes the input processor which in turn requests a new session from the session manager. This session may be created if needed. From then on, the input processor processes requests to and from the pipeline session through a series of get attribute or said attribute commands.

FIG. 28 illustrates the pipeline session life cycle for a pipeline component. In FIG. 28 the webflow requests a session manager to create a new pipeline session. The pipeline processor then generates a new pipeline component.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system, comprising;
an application including nodes, and said application also having a flow associated therewith;
a webflow properties file for storing a plurality of origin event pairs, wherein each one of said plurality of origin event pairs comprises a set from the nodes together with event-based transitions between nodes of the set; and,
a webflow processor for parsing said webflow properties file upon a request of said application, to determine the flow of said application throughout the nodes of the application.

2. The system of claim 1 wherein said nodes includes an action node for generating events based upon a received data at said application.

3. The system of claim 2 further comprising:
a pipeline session for storing said received data for use by other ones of said nodes.

4. The system of claim 3 wherein said action node is a pipeline for operating on said received data to create a new data, and for storing said new data in said pipeline session.

5. The system of claim 4 wherein said pipeline comprises a plurality of pipeline components, wherein each of said plurality of pipeline components may modify said new data according to a predefined business function.

6. The system of claim 4 wherein said application comprises a plurality of Web pages, and wherein each of said plurality of Web pages is represented by one of said nodes, and wherein said pipeline operates on said received data as received at a form on one of said plurality of Web pages.

7. The system of claim 2 wherein said action node is an input process for examining said received data, and determining a particular one of said plurality of origin event pairs based on said examining.

8. The system of claim 7 wherein said application comprises a plurality of Web pages, and wherein each of said plurality of Web pages is represented by one of said nodes, and wherein said input processor examines said received data as received at a form on one of said plurality Web pages.

9. The system of claim 1 wherein said webflow processor is called by said application during an event, together with a particular one of said plurality of origin event pairs, in order to parse said webflow properties file, locate said particular one of said plurality of origin event pairs, determine a corresponding event-based transition, and determine said flow.

10. The system of claim 9 wherein said webflow processor parses said webflow properties file dynamically, to determine said flow in real-time.

11. The system of claim 10 wherein said webflow properties file may be modified, by modifying one or more of said plurality of origin event pairs, to effect a dynamic change in said flow.

12. The system of claim 1 wherein said application is a Web application.

13. The system of claim 12 wherein said Web application comprises a plurality of Web pages, and wherein each of said plurality of Web pages is represented by one of said nodes.

14. The system of claim 13 wherein said plurality of Web pages includes any of HTML, or JSP code.

15. The system of claim 1 wherein said nodes includes a presentation node for presenting static information between events.

16. A method, comprising:
providing an application including nodes, and said application also having a flow associated therewith;
storing, in a webflow properties file, a plurality of origin event pairs, wherein each one of said plurality of origin event pairs comprises a set from the nodes together with event-based transitions between nodes of the set; and,
parsing, at a webflow processor, said webflow properties file, on a request of said application, to determine the flow of said application throughout the nodes of the application.

17. The method of claim 16 wherein said nodes includes an action node for generating events based upon a received data at said application.

18. The method of claim 17 further comprising:
    storing said received data in a pipeline session for use by other ones of said nodes.

19. The method of claim 18 wherein said action node is a pipeline and includes the step of:
    operating on said received data to create a new data, and storing said new data in said pipeline session.

20. The method of claim 19 wherein said pipeline comprises a plurality of pipeline components, wherein each of said plurality of pipeline components may modify said new data according to a predefined business function.

21. The method of claim 19 wherein said application comprises a plurality of Web pages, and wherein each of said plurality of Web pages is represented by one of said nodes, and wherein said pipeline operates on said received data as received at a form on one of said plurality of Web pages.

22. The method of claim 17 wherein said action node is an input processor for examining said received data, and determining a particular one of said plurality of origin event pairs based on said examining.

23. The method of claim 22 wherein said application comprises a plurality of Web pages, and wherein each of said plurality of Web pages is represented by one of said nodes, and wherein said input processor examines said received data as received at a form on one said plurality of Web pages.

24. The method of claim 16 including:
    calling said webflow processor during an event, together with a particular one of said plurality of origin event pairs, in order to parse said webflow properties file, locate said particular one of said plurality of origin event pairs, determine a corresponding event-based transition, and determine said flow.

25. The method of claim 24 including:
    parsing said webflow properties file dynamically, to determine said flow in real-time.

26. The method of claim 25 wherein said webflow properties file may be modified by modifying one or more of said plurality of origin event pairs, to effect a dynamic change in said flow.

27. The method of claim 16 wherein said application is a Web application.

28. The method of claim 27 wherein said Web application comprises a plurality of Web pages, and wherein each of said plurality of Web pages is represented by one of said nodes.

29. The method of claim 28 wherein said plurality of Web pages includes any of HTML, or JSP code.

30. The method of claim 16 wherein said nodes include a presentation node for static information between events.

* * * * *